US011329568B2

United States Patent
Adragna et al.

(10) Patent No.: US 11,329,568 B2
(45) Date of Patent: *May 10, 2022

(54) MULTI-PHASE RESONANT CONVERTER AND METHOD OF CONTROLLING IT

(71) Applicant: STMicroelectronics S.r.l., Agrate Brianza (IT)

(72) Inventors: Claudio Adragna, Monza (IT); Giuseppe Gattavari, Varese (IT); Paolo Mattavelli, Padua (IT); Enrico Orietti, Pozzonovo (IT); Giorgio Spiazzi, Padua (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,534

(22) Filed: Jul. 20, 2020

(65) Prior Publication Data
US 2020/0350826 A1    Nov. 5, 2020

Related U.S. Application Data

(60) Continuation of application No. 16/211,619, filed on Dec. 6, 2018, now Pat. No. 10,756,637, which is a (Continued)

(30) Foreign Application Priority Data

Jun. 24, 2009    (IT) .......................... VA2009A000038

(51) Int. Cl.
H02M 3/335    (2006.01)

(52) U.S. Cl.
CPC ....... *H02M 3/33569* (2013.01); *H02M 3/335* (2013.01); *Y02B 70/10* (2013.01)

(58) Field of Classification Search
CPC ....... H02M 3/156–158; H02M 3/1584; H02M 3/335; H02M 3/337; H02M 3/33507;
(Continued)

(56) References Cited

U.S. PATENT DOCUMENTS

| 5,535,906 A | 7/1996 | Drummond |
| 5,668,707 A | 9/1997 | Barrett |

(Continued)

FOREIGN PATENT DOCUMENTS

| DE | 102005036806 A1 | 2/2007 |
| EP | 1589648 A2 | 10/2005 |
| WO | 9717753 A2 | 5/1997 |

OTHER PUBLICATIONS

Figge, H., et al. "Paralleling of LLC Resonant Converters using Frequency Controlled Current Balancing", PESC2008, Rhodes, Greece, 6 pages.

(Continued)

*Primary Examiner* — Yemane Mehari
(74) *Attorney, Agent, or Firm* — Slater Matsil, LLP

(57) ABSTRACT

A PWM controlled multi-phase resonant voltage converter may include a plurality of primary windings powered through respective half-bridges, and as many secondary windings connected to an output terminal of the converter and magnetically coupled to the respective primary windings. The primary or secondary windings may be connected such that a real or virtual neutral point is floating.

23 Claims, 23 Drawing Sheets

Related U.S. Application Data continuation of application No. 15/693,166, filed on Aug. 31, 2017, now Pat. No. 10,193,461, which is a division of application No. 12/820,549, filed on Jun. 22, 2010, now Pat. No. 9,780,678.

(58) Field of Classification Search
CPC ......... H02M 3/33523; H02M 3/33569; H02M 3/33595; H02M 1/102; H02M 1/12; H02M 1/4208; H02M 2001/0032; Y02B 70/126; Y02B 70/1433; Y02B 70/1475
USPC .............. 363/17, 44, 65, 71, 75, 84, 95; 315/209 R; 216/67; 307/83; 378/101
See application file for complete search history.

(56) References Cited

U.S. PATENT DOCUMENTS

| | | | |
|---|---|---|---|
| 5,729,121 A | 3/1998 | Coenders et al. | |
| 5,737,203 A | 4/1998 | Barrett | |
| 6,031,747 A | 2/2000 | Ilic et al. | |
| 6,246,599 B1 * | 6/2001 | Jang | H02M 3/337 363/132 |
| 6,297,976 B1 * | 10/2001 | Isono | H02M 3/33553 363/65 |
| 6,437,996 B1 | 8/2002 | Wobben | |
| 6,970,366 B2 * | 11/2005 | Apeland | H02M 3/285 363/132 |
| 7,035,125 B2 | 4/2006 | Yoshida | |
| 7,218,059 B2 | 5/2007 | Li et al. | |
| 7,307,361 B1 | 12/2007 | Bendre et al. | |
| 7,414,868 B2 * | 8/2008 | Lee | H02M 3/33507 323/272 |
| 9,148,064 B2 * | 9/2015 | Liu | H02M 3/33561 |
| 9,755,522 B2 * | 9/2017 | Dubus | H02M 3/1584 |
| 9,780,678 B2 * | 10/2017 | Adragna | H02M 3/335 |
| 9,819,275 B2 * | 11/2017 | Otake | H02M 1/08 |
| 10,193,461 B2 * | 1/2019 | Adragna | H02M 3/335 |
| 2008/0298093 A1 | 12/2008 | Jin et al. | |
| 2008/0316776 A1 | 12/2008 | Nakanishi | |
| 2009/0026990 A1 | 1/2009 | Galbiati et al. | |
| 2011/0002445 A1 | 1/2011 | Hattrup et al. | |

OTHER PUBLICATIONS

Prasad, et al., "Analysis and Design of a Three-Phase Off-Line DC-DC Converter with High Frequency Isolation", 1988 IEEE, 8 pages.

* cited by examiner

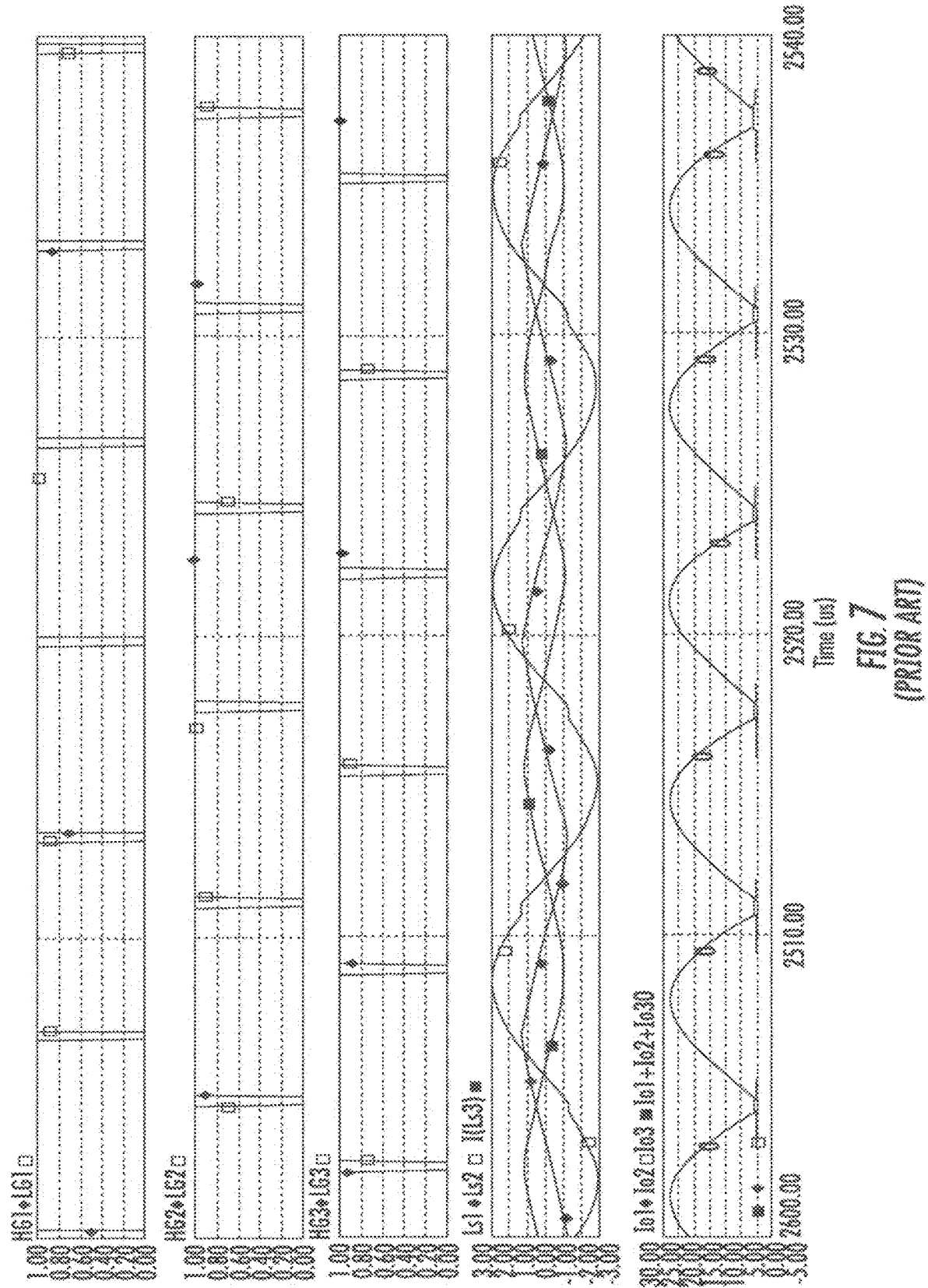

MULTI-PHASE RESONANT CONVERTER AND METHOD OF CONTROLLING IT

CROSS-REFERENCE TO RELATED APPLICATIONS

This application is a continuation of U.S. patent application Ser. No. 16/211,619, filed Dec. 6, 2018, which application is a continuation of U.S. patent application Ser. No. 15/693,166, filed Aug. 31, 2017, now U.S. Pat. No. 10,193,461, which is a divisional of U.S. patent application Ser. No. 12/820,549, filed on Jun. 22, 2010, now U.S. Pat. No. 9,780,678, which claims priority to Italian Application No. VA2009A000038, filed on Jun. 24, 2009, all applications are hereby incorporated herein by reference.

TECHNICAL FIELD

This invention relates to voltage converters and more particularly to switching resonant voltage converters.

BACKGROUND

FIG. 1 is a high level block diagram of a switching resonant voltage converter. Among resonant voltage converters having the basic architecture of FIG. 1, and that are classified based upon the configuration of the resonant circuit that is used, there is the LLC resonant voltage converter. A half-bridge driven architecture of such a converter is illustrated in FIG. 2.

For simplicity, reference will be made to half-bridge driven voltage converters, though the addressed technical problems also affect full-bridge driven voltage converters. One of the weak points of this architecture, especially when functioning at high power levels (>1 kW), is tied to the AC current that flows through the output capacitor $C_{OUT}$. This AC current has large peak and rms values that may require the use of a larger, and thus more encumbering bank of capacitors for the capacitance $C_{OUT}$ than for a forward voltage converter of the same output voltage and power. This considerably burdens the LLC resonant converter, especially in power applications of relatively large power density such as, for example, power supply systems for servers or for telecommunication systems, in which its high efficiency characteristic is particularly advantageous.

The multi-phase or "interleaving" techniques may prevent this drawback. A multi-phase voltage converter may be obtained by connecting in parallel two or more switching converters of a same architecture to make them share the same input voltage generator, and supply the same output load. Moreover, with an appropriate phase control of the driving signals of the power switches, it may be possible to minimize or, in certain cases, even to practically nullify the ripple on the output current (sometimes even on the input current) of the converters.

Other advantages of the multi-phase approach are the possibility of subdividing the overall power requirement among a number of smaller converters thus making a larger power density possible and optimizing efficiency over a larger interval of load currents using the "phase shedding" technique. That is, turning off one or more phases when the load decreases, and managing the reduced requirement with a reduced number of converters, thus reducing losses due to parasitic components of the power circuits that may become dominant with low power conditions.

The Interleaving Technique Achieves:
1) reduction of the ripple of the output and input currents of the converter;
2) reduction of the power managed by each converter with a consequent optimization of their dimensioning;
3) increased efficiency over a wide range of output load because of the turning off one or more phase circuits when functioning at low power and reduction of losses due to parasitic components; and
4) greater power density and smaller form factor. To achieve the above beneficial effects, it may be essential to ensure that the load of the converter be subdivided as equally as possible among the phase circuits. This is a serious obstacle to implementation of "interleaving" techniques in multi-phase resonant voltage converters.

To better illustrate the problem, reference is made to the three-phase LLC resonant voltage converter of FIG. 4, though the same considerations hold for resonant converters of a different type and with any number of phases. The distinct phase circuits are driven at the same frequency, and the driving signals of the power switches are mutually phased apart by 120° making the currents of the output diodes superpose with continuity. This functioning condition is illustrated in the time graphs of FIG. 5.

In a first harmonic approximation, the functioning of a single LLC resonant phase is quantitatively described by means of characteristic curves, as the ones depicted in FIG. 6. In these figures the abscissa is the operating frequency x, normalized to the series resonant frequency associated with the elements Cr and Ls of the resonant circuit of FIG. 2, and the ordinate is the ratio M between the voltage on the nodes of the secondary winding, which is equal to the sum of the output voltage and the voltage drop on the secondary rectifiers translated to the primary circuit, and the input voltage. Each characteristic curve is associated to the quality factor Q of the resonant circuit that is inversely proportional to the output resistance $R_{OUT}$. As a consequence, Q is substantially proportional to the output current $I_{OUT}$, and each curve is substantially associated with a value of the load current.

The three phase circuits are powered with the same input voltage, they "see" the same output voltage, and work at the same frequency. If the three phase circuits are exactly identical among them, they will work with the same current amplitude, as shown in FIG. 5.

Nevertheless, in a real world implementation, the inevitable tolerances of the components must be taken into consideration. Thus, the three phase circuits may have different values of the ratio M because of the effect of different voltage drops on the respective secondary rectifiers and of different values of x, and/or of the proportionality constant between Q and $I_{OUT}$ because of differences among the values of Ls, Cr and Lp of the three resonant circuits. As a consequence, the currents in the various phase circuits will differ, and one of them may even provide the whole power for the load, while the other phases may be inactive.

These theoretical predictions are confirmed by simulation. In the diagrams of FIG. 7 the same signals of FIG. 5 relating to the converter of FIG. 4 are shown, but the value of the capacitor Cr of the phase circuit 2 is reduced by 10% and that of phase circuit 3 is increased by 10%. The currents through phase circuits 1 and 3 are close to zero, and the current of phase circuit 2 is almost equal to the output current. Solely phase circuit 2 is effectively working, and there is no interleaving among the phase circuits. More precisely, compared with the ideal case of FIG. 5, the average output current of phase circuit 1 is reduced by 97.4%, that of phase circuit 2 is increased by 297%, and that of phase circuit 3 is zero; the peak-to-peak amplitude of the ripple of the output current, divided by its mean value, has changed from 17.8% to 165%. The rms value of the output current divided by the mean value is 114%. The rms value of the AC component is 55% of the mean value. As could have been expected, these values resemble those of a single phase LLC resonant voltage converter. This situation, verified in an exemplary test case, is unacceptable because it would force to size each phase converter for delivering the whole output power, without any reduction of the ripple of the output current.

Published U.S. patent application No. 2008/0298093 A1 "Multi-phase resonant converters for DC-DC application," discloses a three-phase LLC resonant voltage converter including three half-bridges connected to the same input bus (re.: the architecture of FIG. 4, in which a further phase circuit in parallel to the two depicted phase circuits has been added), and shows that it is possible to balance the phase currents. Indeed, only the ideal case of exactly identical converters is considered, neglecting spreads among the components.

In U.S. Pat. No. 6,970,366, entitled "Phase-shifted resonant converter having reduced output ripple", a system of two LLC resonant converters, synchronized and mutually phased apart by 90° to minimize the overall ripple is disclosed. The document is silent about balancing the two phases.

In the article by H. Figge et al., entitled "Paralleling of LLC resonant converter using frequency controlled current balancing", IEEE PESC 2008, June 2008, pp. 1080-1085, a system is disclosed in which a DC-DC buck conversion stage is installed upstream of a two-phases LLC resonant converter. The regulation loop of the output voltage modulates the voltage generated by the buck (and, thus, the input voltage of the two half-bridges). A regulation loop of the balancing of the currents through the two phases determines the switching frequency of the half-bridges that are relatively phased apart by 90°. This architecture addresses the problem of balancing the currents at the cost of employing an additional conversion stage that reduces overall efficiency and increases the overall complexity of the converter circuit.

The degree of freedom to balance the currents could be provided by duty-cycle adjustment. In this way, the mean value of the voltage applied to each phase would be adjustable. Nevertheless, as shown in the simulations of FIG. 8, this approach may be followed only if small adjustments are sufficient for obtaining a satisfactory balancing. Indeed, a duty-cycle significantly different from 50% would generate strongly asymmetrical currents in the secondary windings of the transformer and in the output diodes, thus the balancing problem would be merely shifted elsewhere. For implementing this method, the reactive components of the resonating circuits would have to be selected accurately, which is costly.

The recognized problems of known interleaved resonant architectures could be resumed, because of their marked sensitivity to differences among the power circuits and difficulty of finding a control variable that would be conveniently used for compensating the consequent unbalancing of the currents among the single phase circuits. This is an indispensable condition for reducing the ripple of the output current, the main reason for implementing the interleaving.

SUMMARY

An architecture of multi-phase resonant converters has been found capable of maintaining a good balancing of the currents in each phase, even in the presence of relevant differences among the components of the respective power circuits. This is achieved by connecting the primary windings and/or the secondary windings of the multi-phase converter to leave the respective real or virtual neutral point floating.

According to an embodiment, the primary windings of the converter may be star connected, and the real neutral point of the star may be coupled to a node at a reference potential through a normally open auxiliary switch. This switch may be closed at low load currents for turning off all the phases of the converter except one.

According to another embodiment, the converter may have a control circuit configured to generate pulse width modulation (PWM) driving signals mutually phased apart as a function of phase control signals input to the control circuit. Current sensors of the current circulating in each of the primary or secondary windings may be adapted to generate respective sensing signals, and a circuit may compare the sensing signals and generate phase control signals that are input to the control circuit. With this architecture a control method is implemented according to which the PWM driving signals are mutually phased apart for compensating eventual residual current unbalances.

A control method of the multi-phase resonant converters is also provided. It contemplates the steps of driving only the half-bridge of a phase, leaving on the low-side switch of the half-bridge of another phase, and turning off the other half-bridges of the resonant converter when the supplied current delivered by the converter becomes smaller than a pre-established minimum threshold.

The methods may be used with any configuration of the resonant circuit, for example LLC, LCC, or other resonant circuit, independently from the number of phases of the converter by connecting the power circuits in such a way as to leave the real or virtual neutral point of the primary or of the secondary floating.

BRIEF DESCRIPTION OF THE DRAWINGS

FIG. 7 are graphs of waveforms similar to those of FIG. 5, having the capacitance of the phase circuit 2 is reduced by 10% and the capacitance of the phase circuit 3 is increased by 10%.

DETAILED DESCRIPTION OF ILLUSTRATIVE EMBODIMENTS

Several exemplary embodiments of this invention will be described making reference to a three-phase LLC resonant voltage converter, but the same considerations hold also for multi-phase resonant voltage converters of a different type and/or with any other number of phases.

Figure 1:
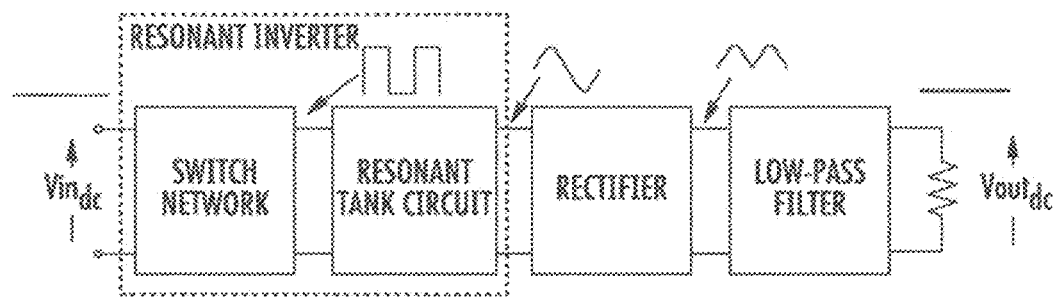
FIG. 1 is a high level schematic block diagram of a typical resonant DC-DC converter according to the prior art.
Figure 2:
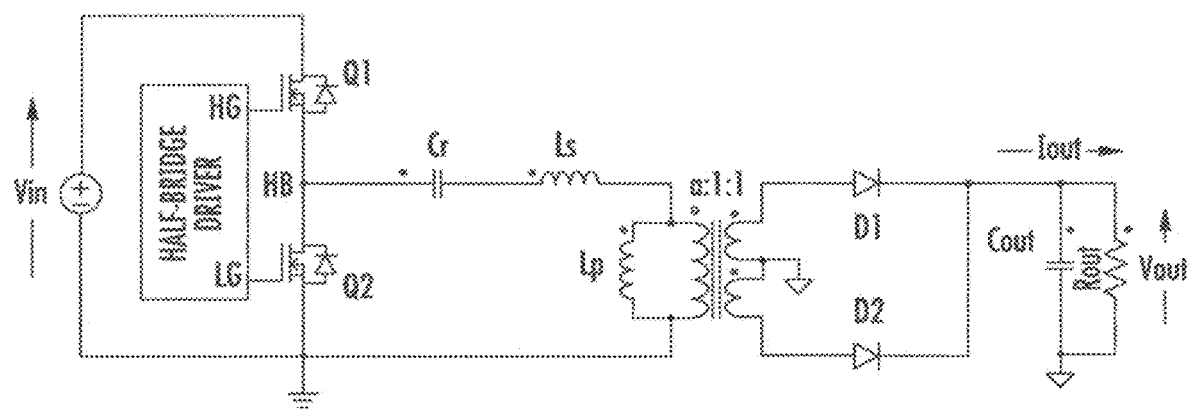
FIG. 2 is a schematic diagram of an LLC resonant half-bridge with split (center-tap) secondary windings and full wave rectification through diodes according to the prior art.
Figure 3:
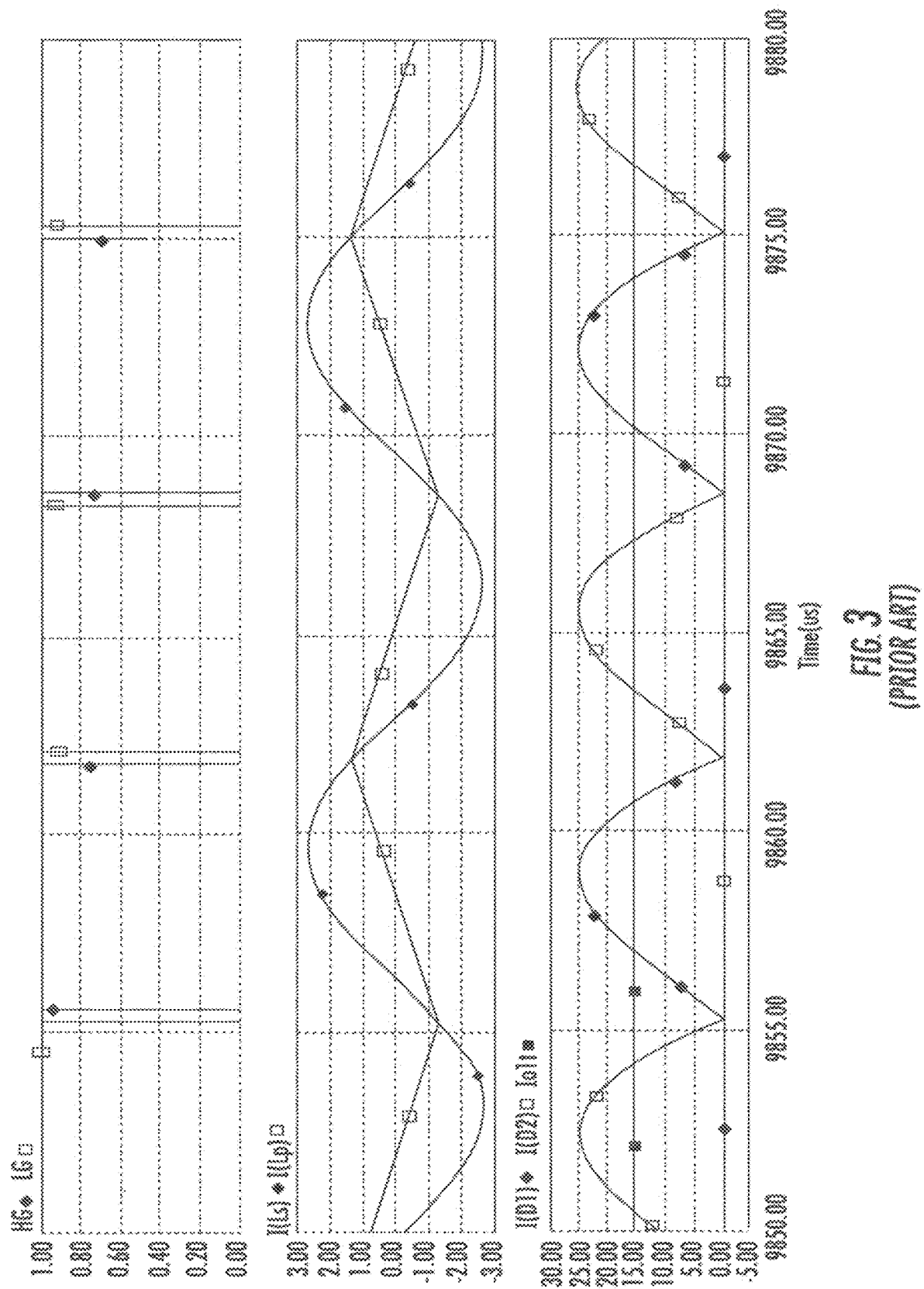
FIG. 3 are graphs of typical waveforms of the converter of FIG. 2 when operating near the resonant frequency associated to components Ls and Cr.
Figure 4:
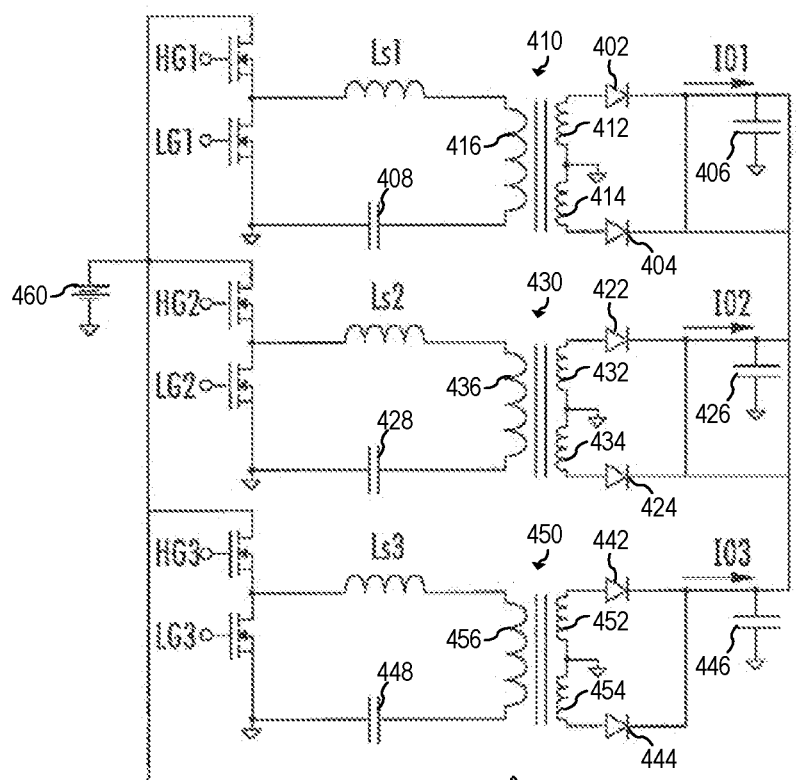
FIG. 4 is a schematic diagram of an exemplary prior art three-phase LLC resonant converter wherein the interleaving is obtained by relatively phasing apart by 120° the driving signals of the three half-bridges.
Figure 6:
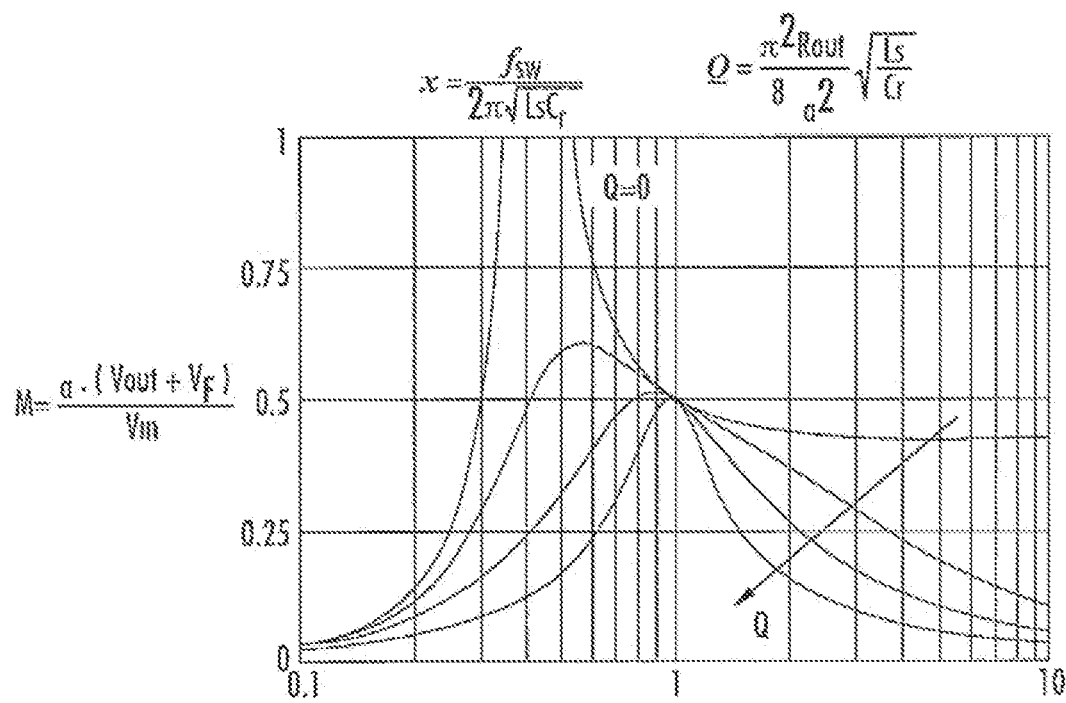
FIG. 6 is a graph of the transfer characteristic of a half-bridge driven LLC resonant converter in accordance with the prior art.
Figure 9:
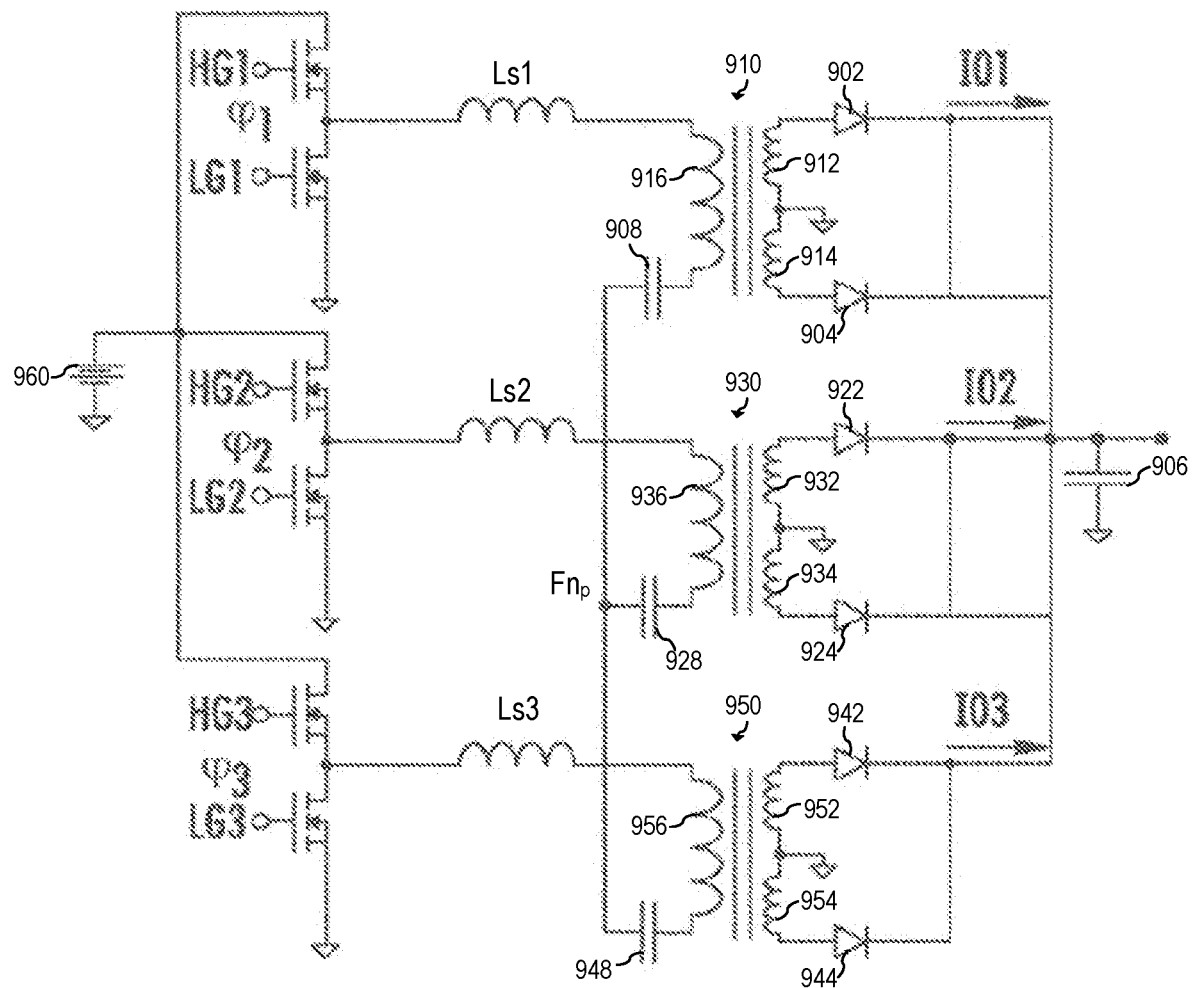
FIG. 9 is a schematic diagram of an embodiment of a three-phase LLC resonant converter with an isolated neutral point on the primary side in accordance with the present invention.

A three-phase LLC resonant DC-DC voltage converter for limiting unbalance among phase currents is illustrated in FIG. 9. The three LLC resonant circuits on the primary side are connected to a floating common node (real neutral point) $Fn_p$ different from the prior art converter of FIG. 4 where the neutral point is grounded. The multi-phase resonant DC-DC voltage converter of this disclosure may be controlled using the same driving signals phased apart by 120° of the half-bridges of the prior art converter of FIG. 4.

Figure 5:
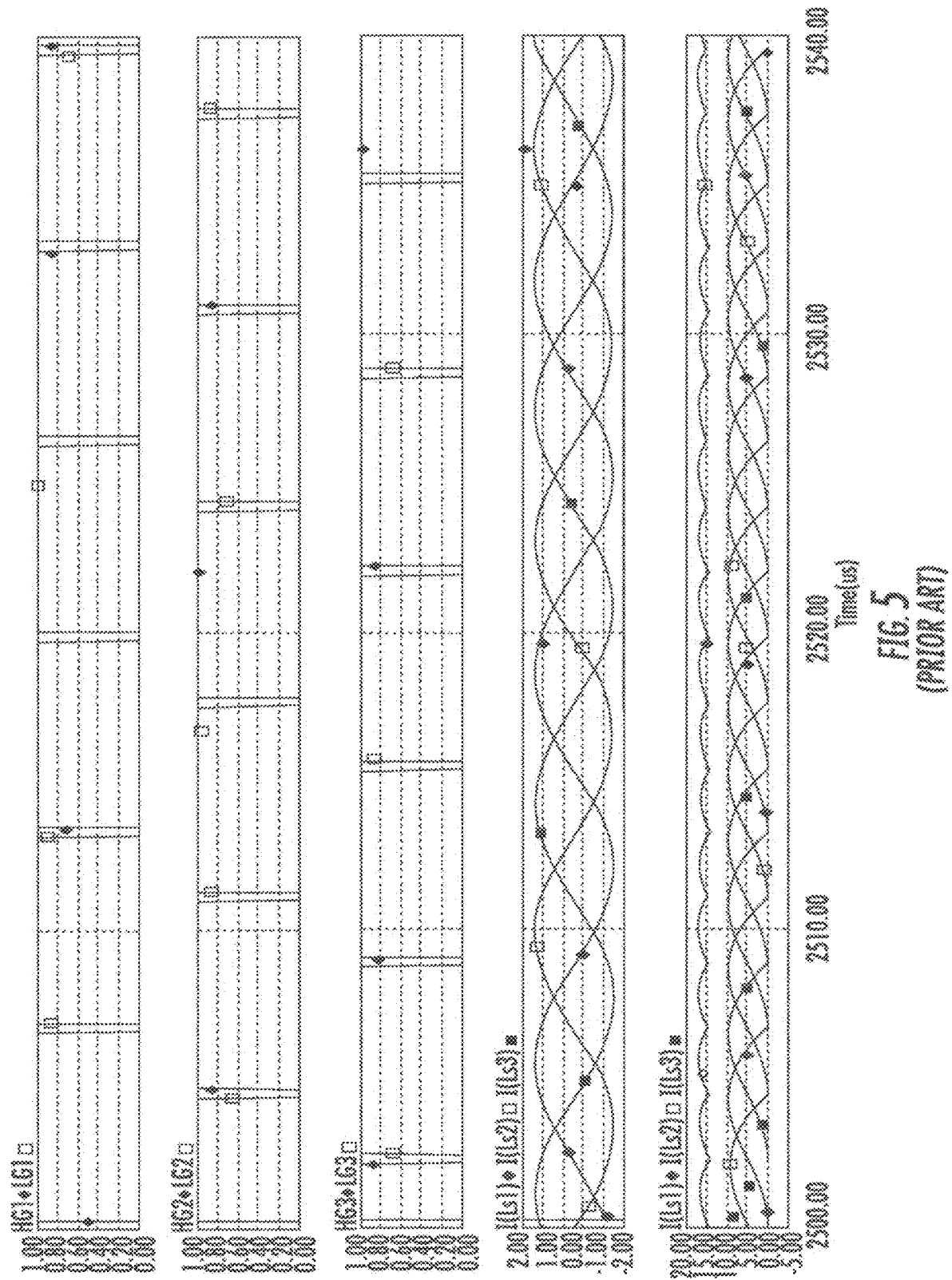
FIG. 5 are graphs of driving signals and currents through each phase of the converter of FIG. 4 with hypothetically identical phases.
Figure 8A:
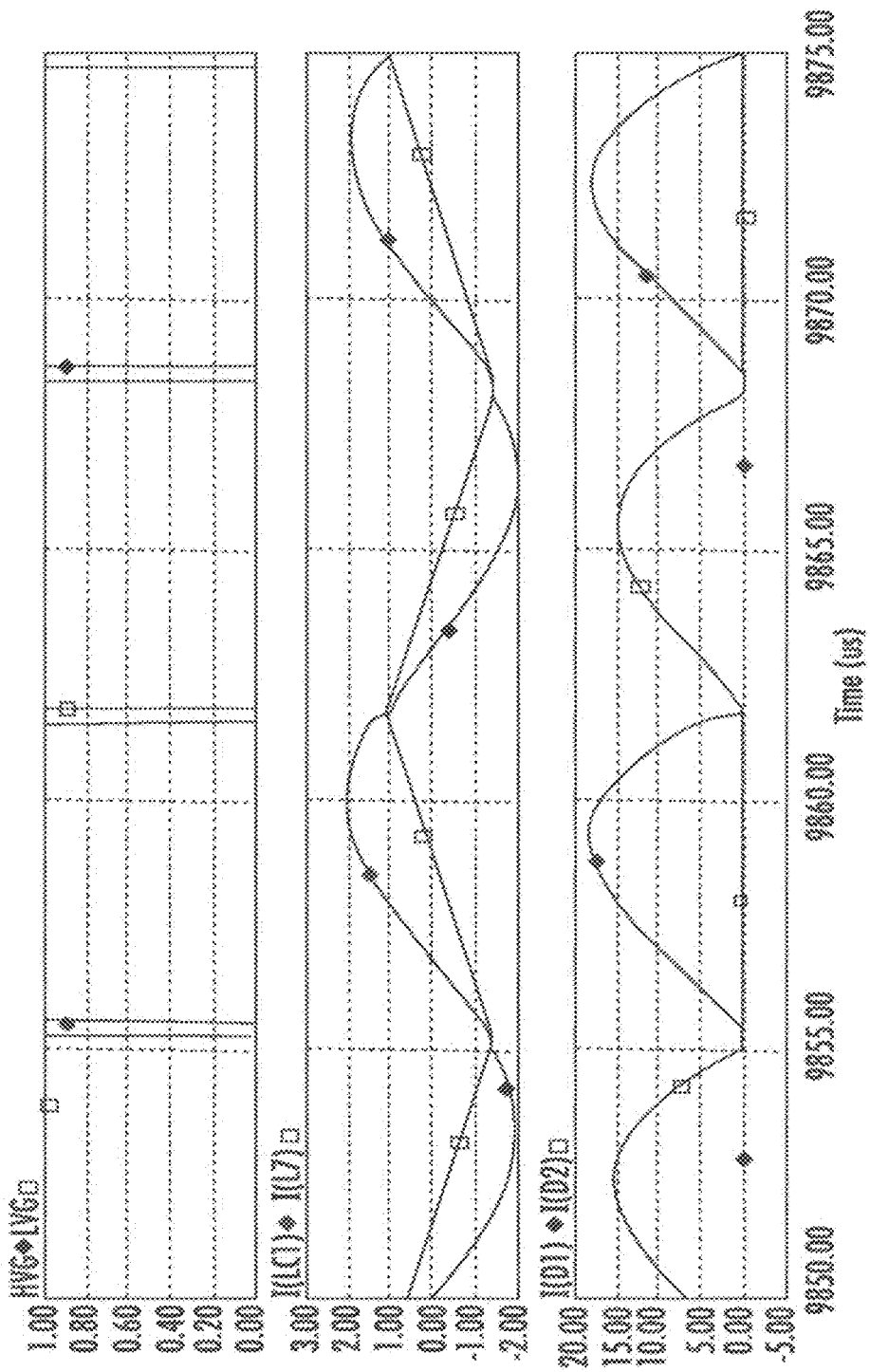
FIGS. 8a-8c are graphs illustrating the effects of a duty-cycle unbalance in a phase circuit.
Figure 8B:
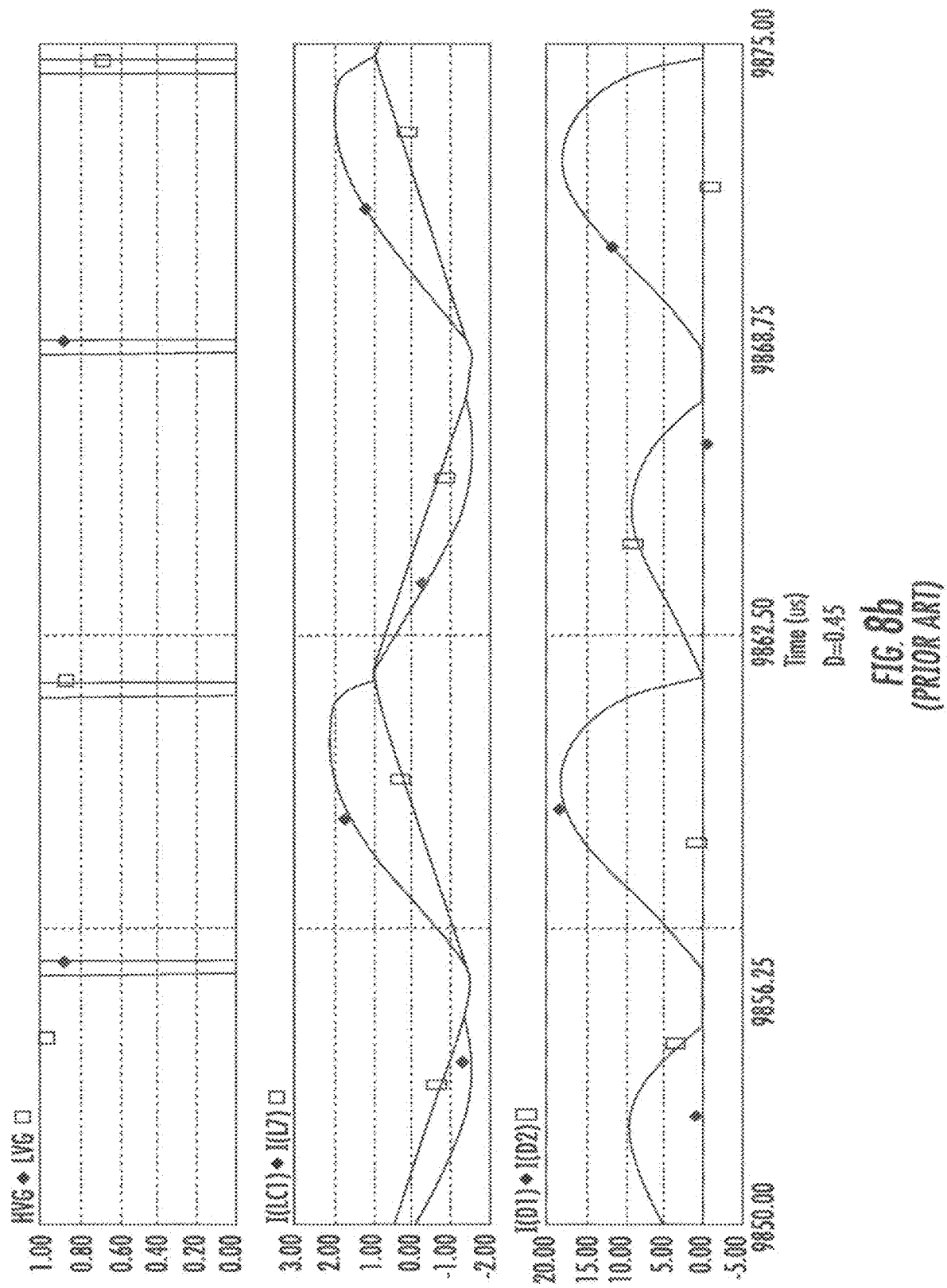
Figure 8C:
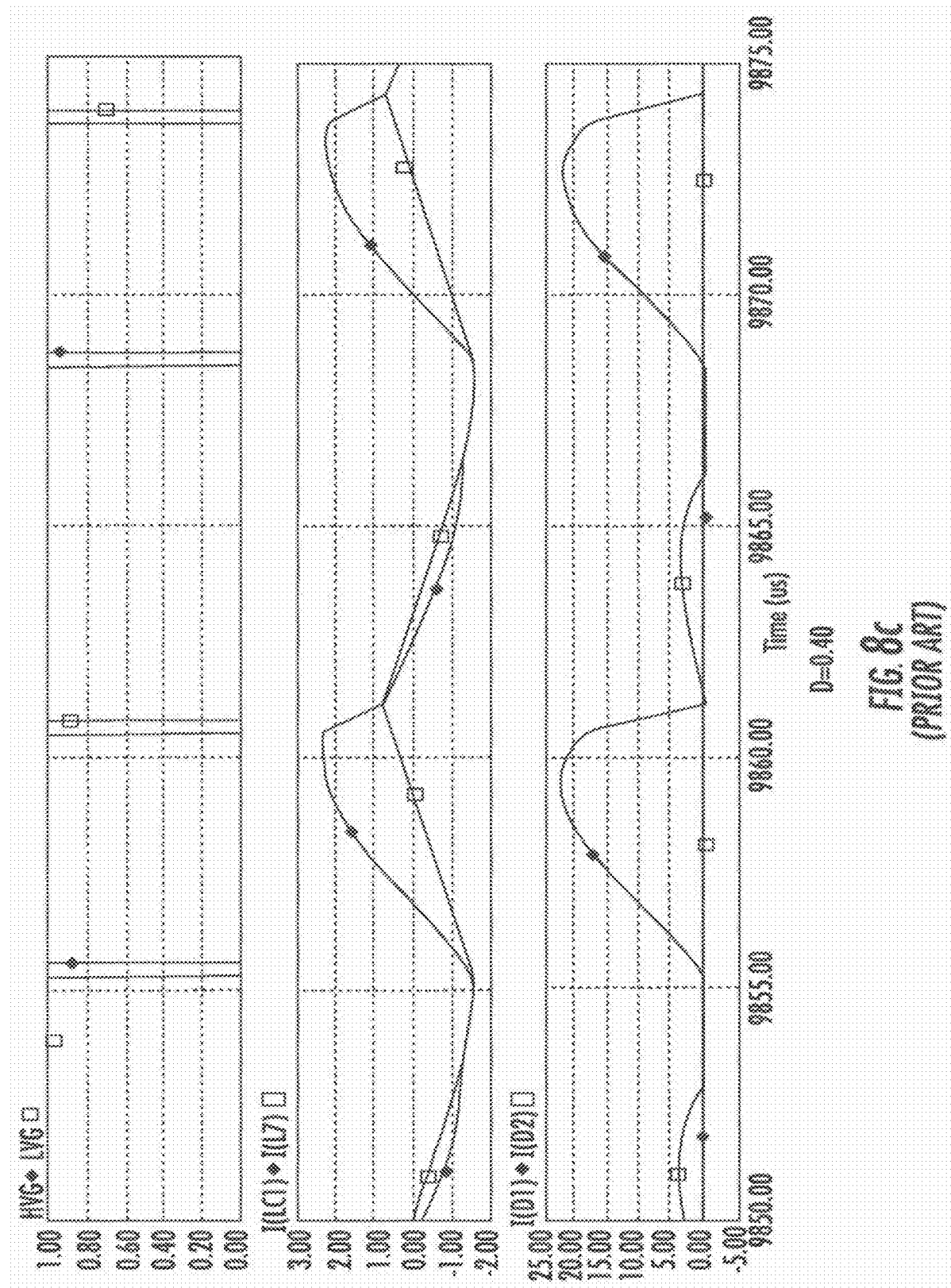

The fact that the potential of the neutral-point is not grounded, introduces a "negative feedback" that tends to balance the working points of the single phase circuits, thus preventing a single phase circuit from delivering the whole current required by the load, while the other phase circuits are practically inactive. This is evident in the graphs of FIG. 10 that illustrate waveforms obtained using the same driving signals used for the graphs of FIG. 7 relative to the prior art converter of FIG. 5 under the same unbalance conditions. In the multi-phase resonant voltage converter of this disclosure, the phase currents are far more uniform than in the known converter of FIG. 4.

Figure 10:
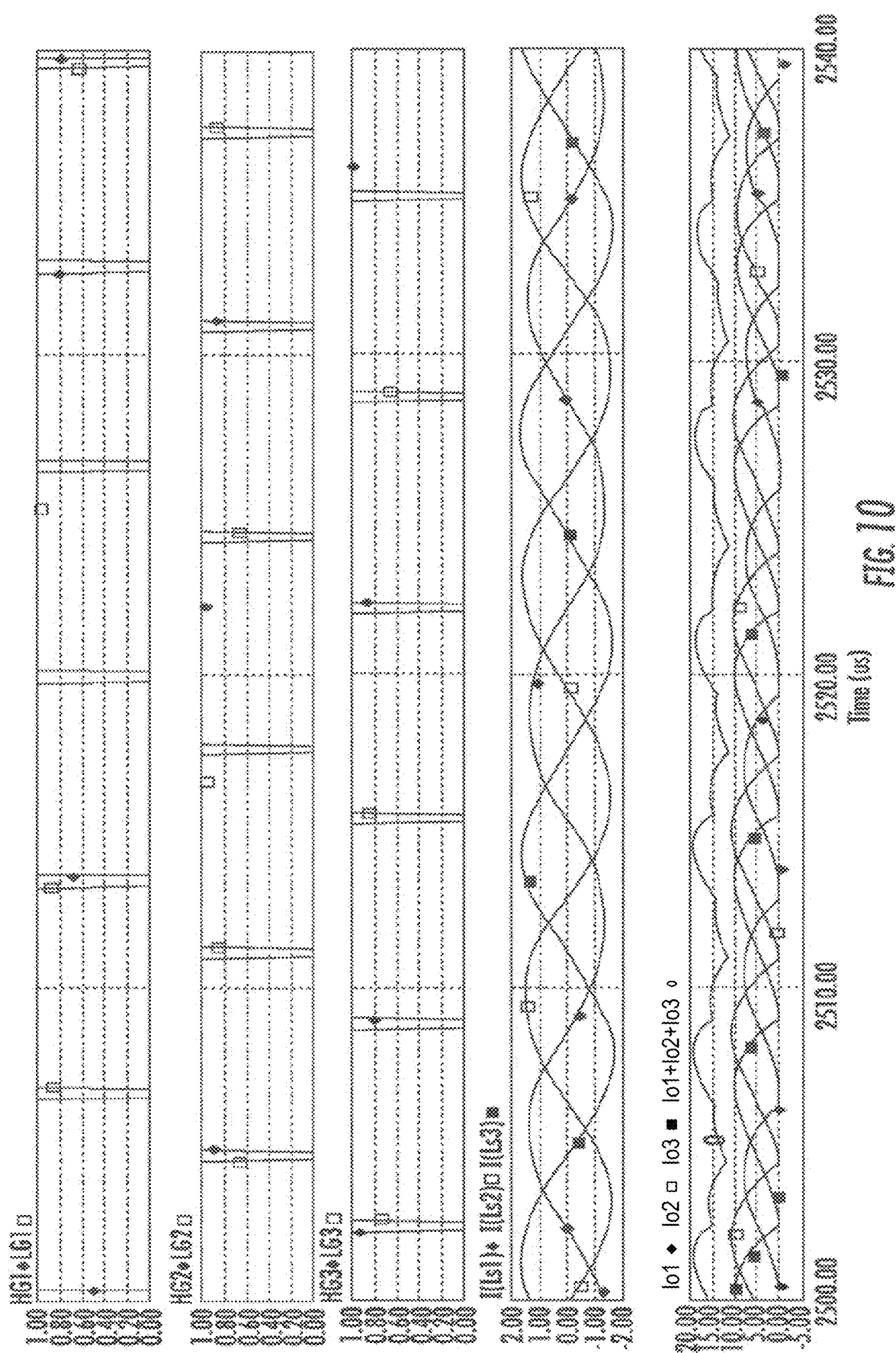
FIG. 10 are time graphs of driving signals and of the currents of the phase circuits for the converter of FIG. 9, and under the same conditions of unbalance of FIG. 7.
Figure 11B:
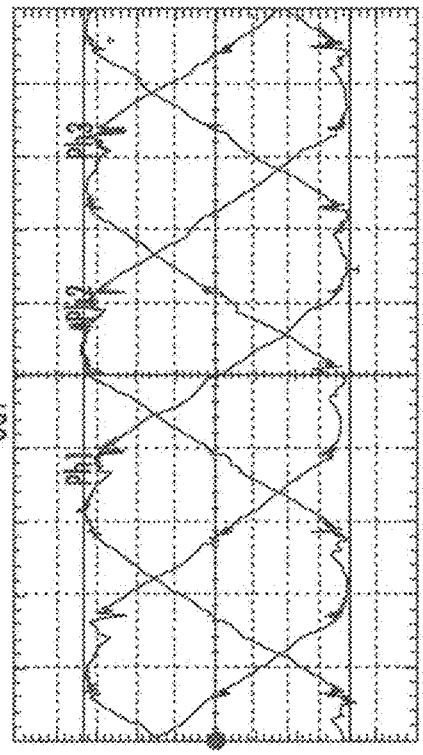
FIGS. 11a-11d are graphs of the primary currents and the results of the measurements of the DC output currents of the phases for the converter of FIG. 9 for the values specified in Table 1.
Figure 11D:
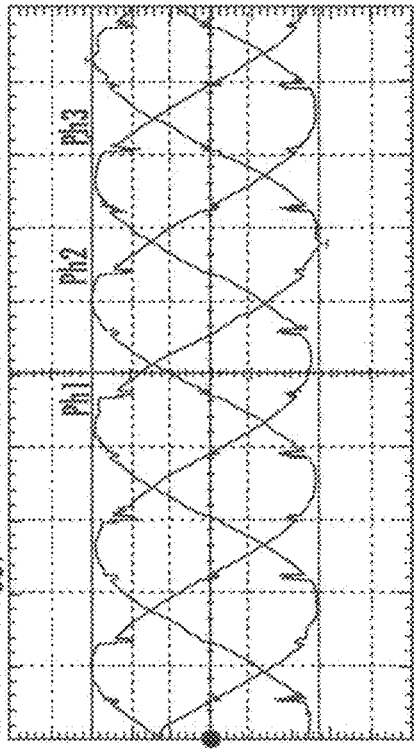
Figure 11A:
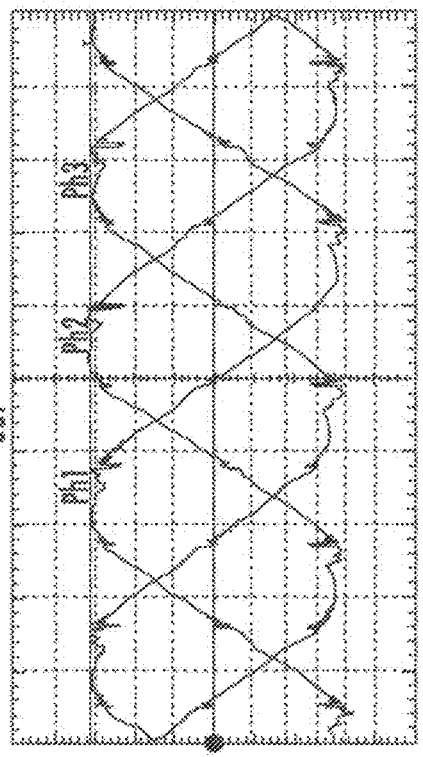
Figure 11C:
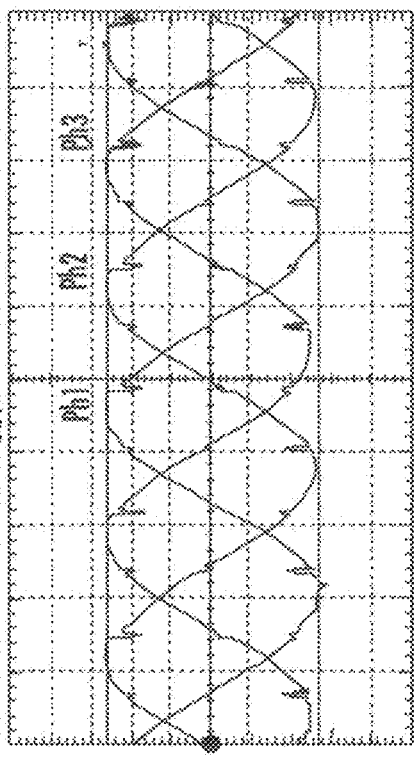
Figure 12B:
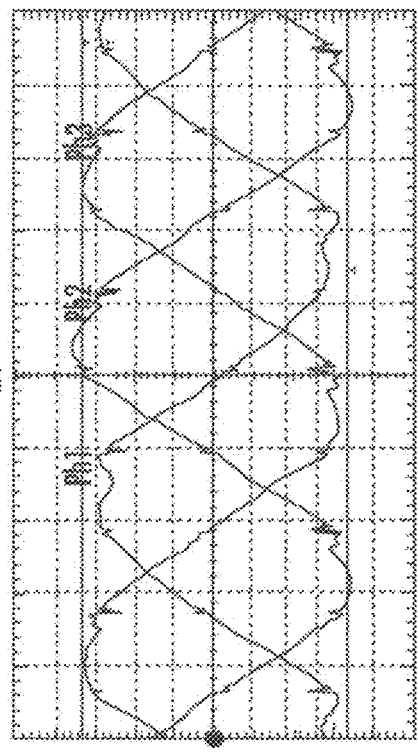
FIGS. 12a-12d are graphs of the primary currents and the results of measurements of the DC output currents of the phase circuits for the converter of FIG. 9 with the values specified in Table 1 and with a further capacitor of 2.7 nF.
Figure 12D:
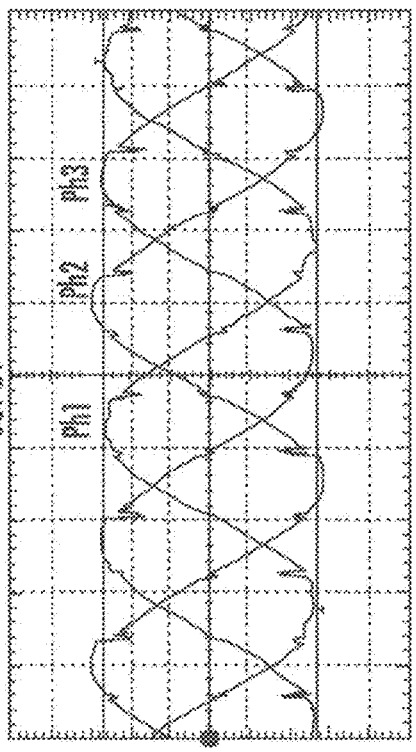
Figure 12A:
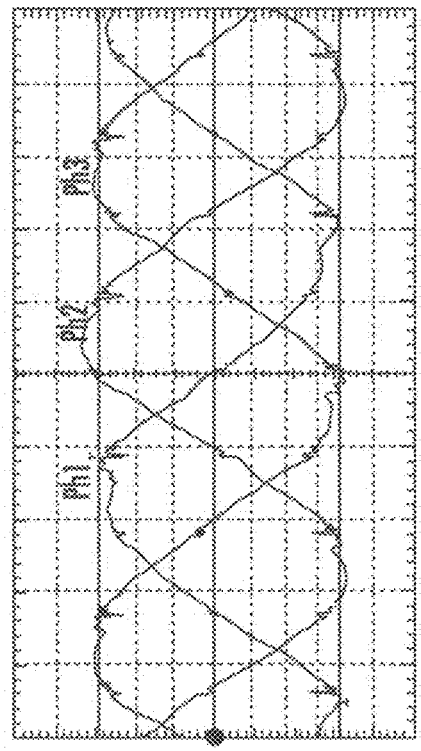
Figure 12C:
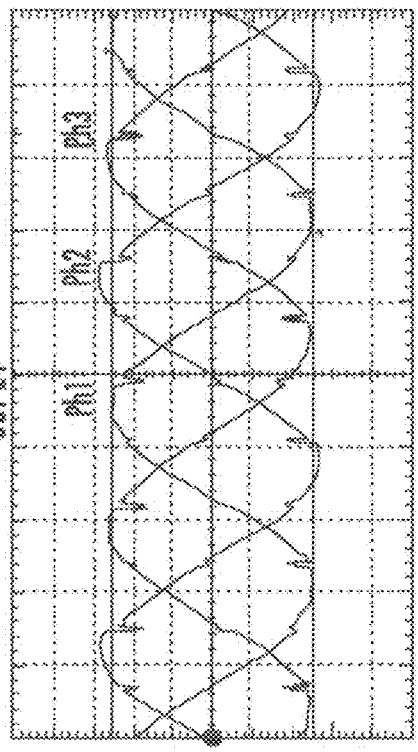

By comparing the time graphs of FIG. 10 with those of FIG. 7, it may be recognized that in the former case, all three phases are working with a maximum unbalance that is 14 times smaller than that of FIG. 7; the peak-to-peak amplitude of the output current waveform is reduced by a factor larger than 3; and the rms value of the AC current by a factor of about 4.

These results are also substantially confirmed by measurements shown in the graphs of FIGS. 11 and 12, carried out on a prototype formed according to the scheme of FIG. 9, and with the design parameters shown in Table 1:

TABLE 1

| Minimum DC input voltage | Vin_min | 320 V |
| Nominal DC input voltage | Vin | 390 V |
| Maximum DC input voltage | Vin_max | 420 V |
| Regulated output voltage | Vout | 24 V |
| Maximum output current | Iout | 8 A |
| Nominal resonant capacitor | Cr | 22 nF |
| Leakage inductance | Lr | 110 μH |
| Magnetization inductance | Lm | 585 μH |
| Nominal resonant frequency | Fr | 100 kHz |
| Output capacitor | Cout | 100 μF |

In many applications, the performance of the converter of FIG. 9, in terms of phase current balance, would be quite acceptable and may not need any specific further action for improving it. In applications where an enhanced balance of the phase currents is desired, the converter of FIG. 9 may be satisfactorily used, though the mutual relative phases between driving signals of the half-bridges may be adjusted. Relative phasing introduces a degree of freedom, that is a control variable for implementing a regulation loop to nullify any residual unbalance among the phase currents.

Well known techniques for carrying out such a feedback control may be implemented by any skilled person. For example, it may be possible to sense the secondary currents or the resonant primary currents; the sensing may be performed through a current transformer or through sensing resistors; and the error signals may be generated and processed through mutual comparisons and/or with reference values, or by the use of error amplifiers with frequency compensations, or even through analog or digital processing. Control may be implemented by leaving a phase circuit fixed, driving it with unmodified drive signals, and modulating the driving signals of the other phase circuits, or by modulating all the driving signals of the phase circuits, etc. The skilled designer will choose the most appropriate control technique in consideration of design specifications, characteristics, performance of the converter, and cost restraints.

Figure 13:
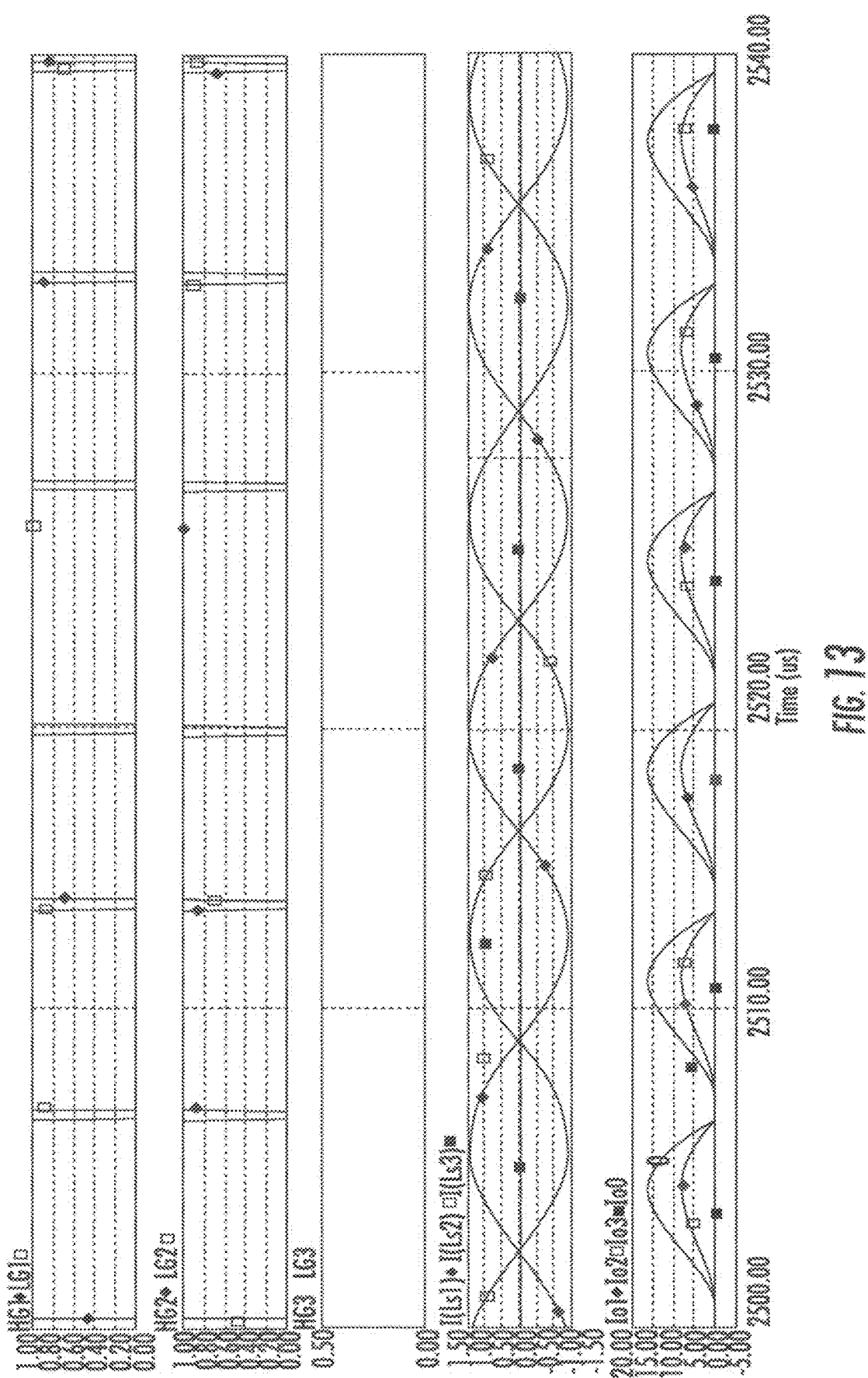
FIG. 13 are graphs of waveforms of the main signals of the converter of FIG. 9 when the phase circuits φ1 and φ2 are active.

When the output load is relatively low, the multi-phase resonant converter may be controlled also by driving only two phase circuits and leaving the other phase circuit(s) isolated, as illustrated in the graphs of FIG. 13, to improve the conversion efficiency. As it may be noticed, even in this functioning condition, the two active phases are balanced.

Figure 14:
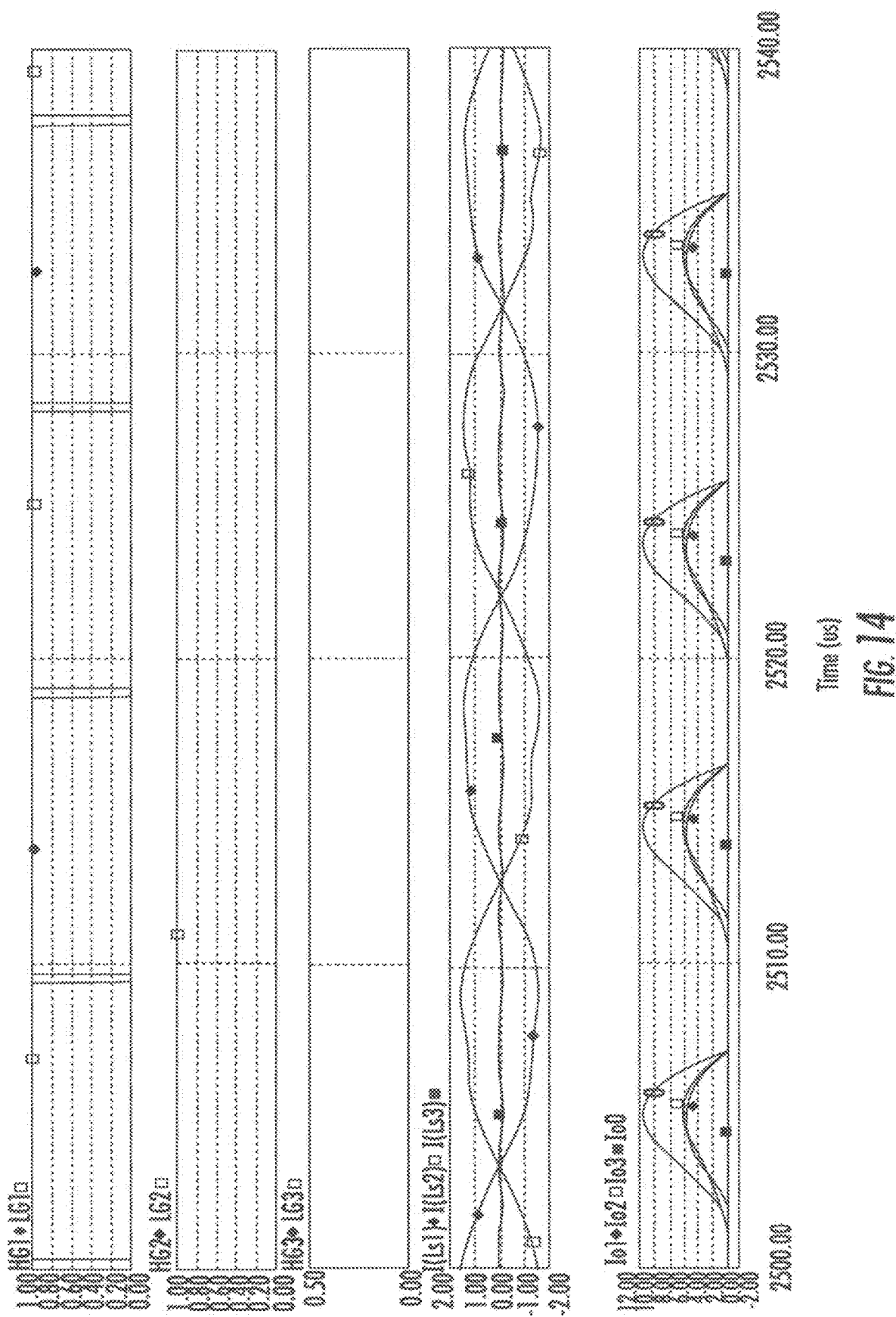
FIG. 14 are graphs of waveforms of the main signals of the converter of FIG. 9 when the sole phase circuit φ1 is active.

It may also be possible to drive a single half-bridge of the multi-phase resonant converter when the converter delivers relatively low currents. This may be done by keeping on one or more low-side switches of another half-bridge to close the circuit. Exemplary graphs obtained by driving the converter of FIG. 9 in such a functioning condition are shown in FIG. 14.

Figure 15:
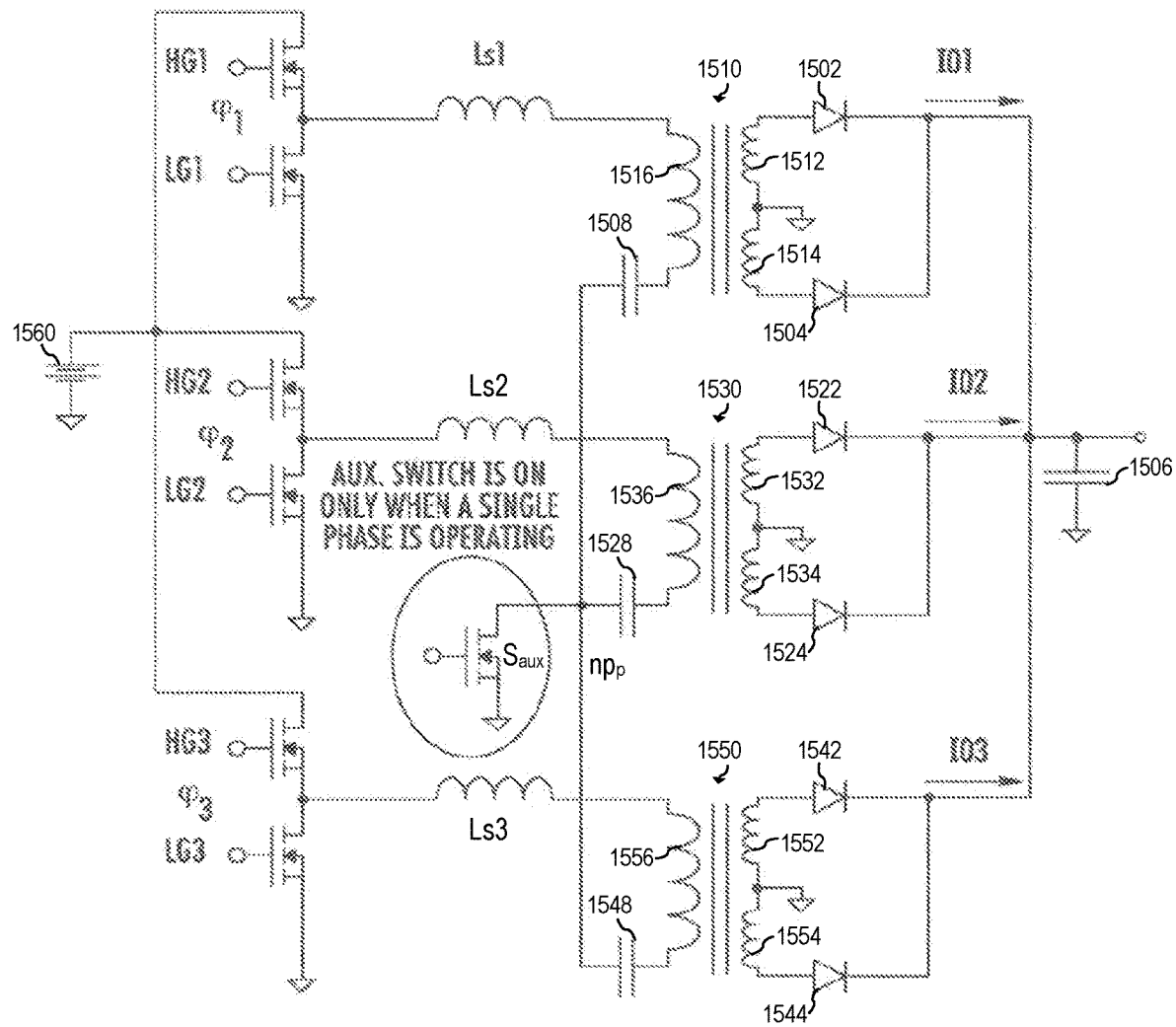
FIG. 15 is a schematic diagram of another embodiment of the converter of FIG. 9 with a normally open auxiliary switch in accordance with the present invention.
Figure 16:
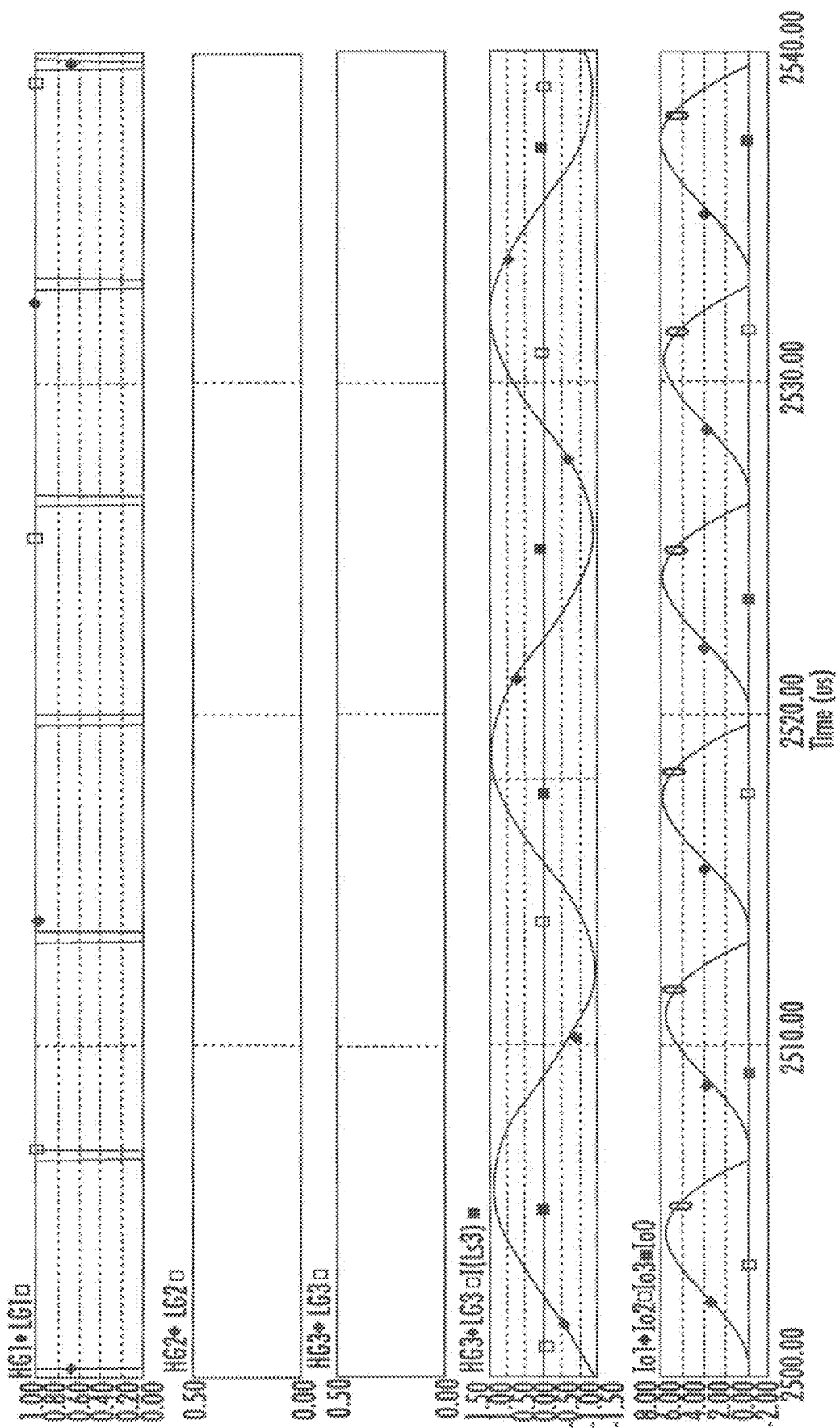
FIG. 16 are graphs of waveforms of the main signals of the converter of FIG. 15 when the sole phase circuit φ1 is active and the auxiliary switch is closed.

FIG. 15 illustrates another embodiment of the multiphase converter having a normally off auxiliary switch $S_{aux}$ for grounding the real neutral point $np_p$ of the primary circuit. If the converter has to deliver a relatively low output current, only a half-bridge is driven, and the other half-bridges are kept off and the auxiliary switch is closed. An exemplary time diagram obtained in this functioning condition is illustrated in the graphs of FIG. 16.

Figure 18:
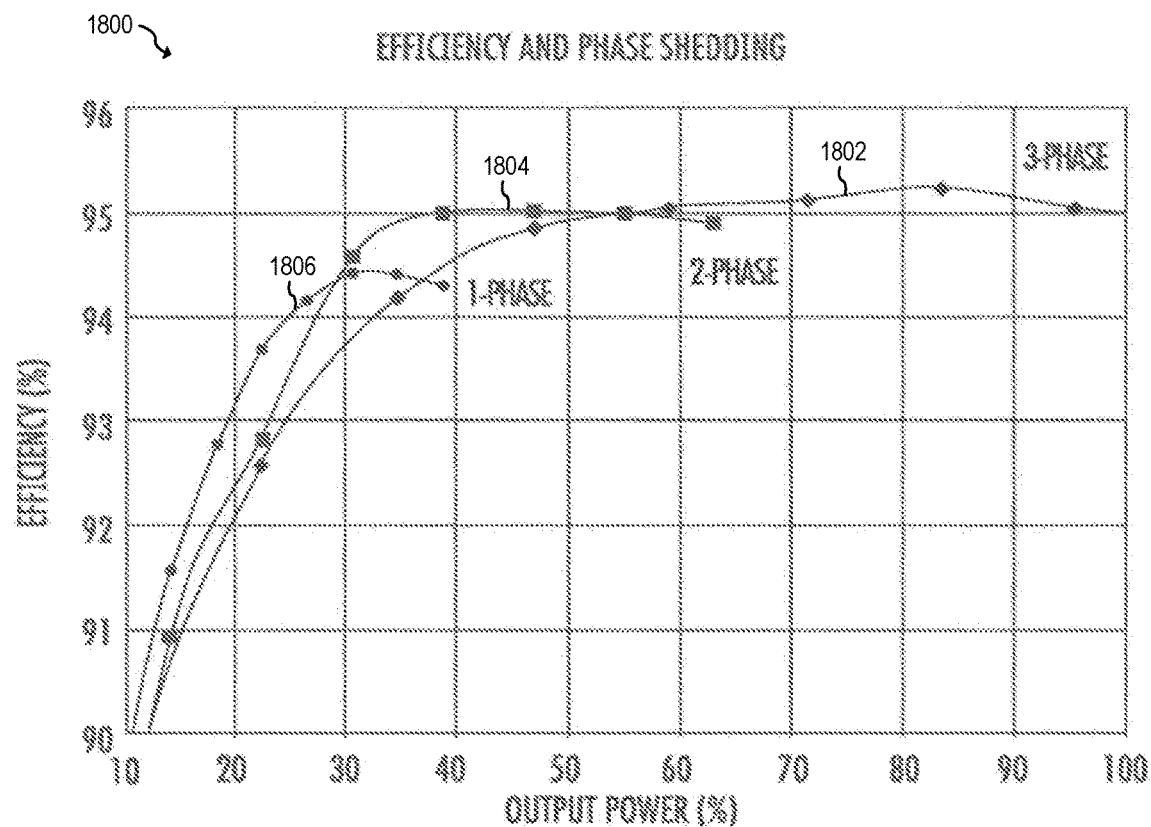
FIG. 18 is a graph of the conversion efficiency of the converter of FIG. 15 with the parameters defined in Table 1, as a function of the number of active phase circuits.

Experimental results, illustrated in the graph 1800 of FIG. 18, show that the efficiency improves at medium-low load conditions. Therefore, it may be desirable to turn off a phase circuit when the load decreases below 55% of the maximum rated load (see curve 1804), and operate with a single phase circuit when the load becomes smaller than 30% of the maximum load (see curve 1806).

When only two phase circuits are active, it may be desirable to drive the two half-bridges in phase opposition: when the third phase circuit is switched off, the phase regulation loop, if present, is disabled and the relative phase varies from 120° (or a value not much different from this value, in case the phase regulation loop is present) to 180°. In this case the converter is driven in a full-bridge mode.

The characteristics of the resonant circuit are only slightly modified: both the inductances and the resonant capacitances are coupled in series. If the two resonant circuits were identical, the resonant frequency would not change; the characteristic impedance doubles but, since the two secondary circuits are electrically coupled in parallel, the quality factor Q remains unchanged. Small differences are present because the two resonant circuits do not match exactly, and thus the regulation loop of the output voltage of the converter may act in a limited manner for correcting the working frequency.

One or more low-side MOSFETs of the inactive half-bridges may be kept on for allowing current to circulate through a single phase circuit. In the first case, the resonant circuit, switching from two active phase circuits to one active phase circuit, is not (nominally) altered; nevertheless, the functioning conditions switch abruptly from a full-bridge to a half-bridge mode, consequently halving the gain. This places a heavy burden on the regulation loop of the output voltage of the converter to compensate for the abrupt gain variation with an appropriate reduction of the working frequency. In the latter case, all phase circuits participate in the delivery of energy (even if in an unbalanced manner), but with a great variation of the characteristics of the resonant circuit. Thus, also in this case, the regulation loop of the output voltage should be able to reduce the working frequency.

Figure 17A:
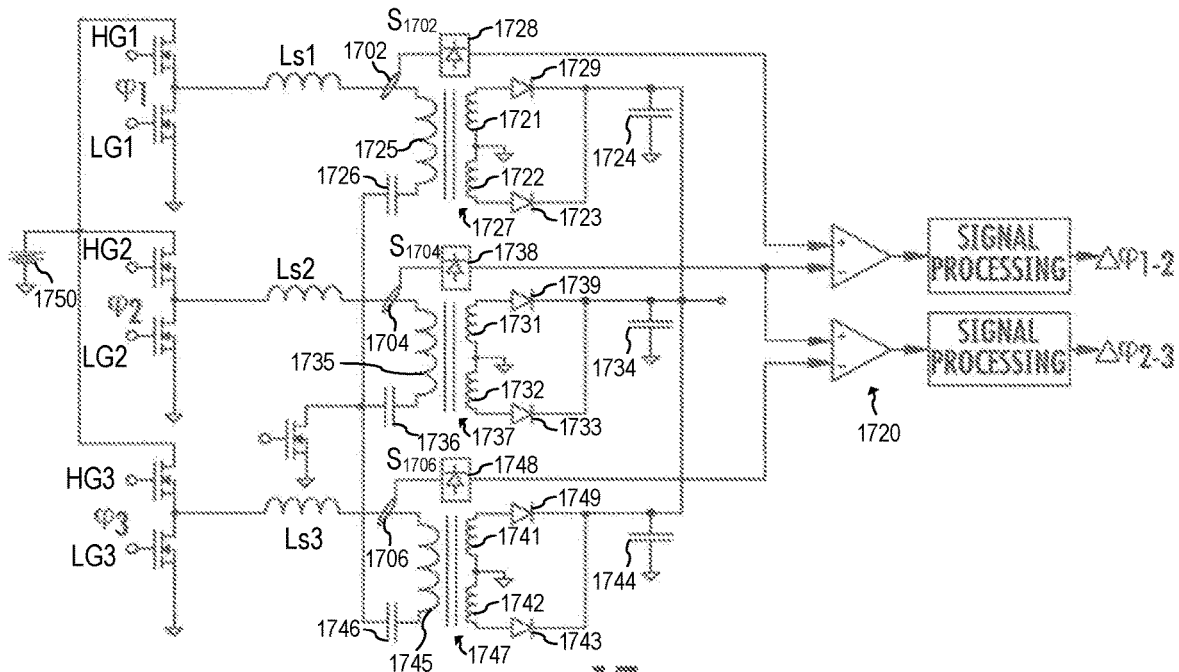
FIGS. 17a-17c are schematic diagrams of regulation loops of the mutual relative phases of the single phase circuits for nullifying the residual unbalancing of the output currents of each phase circuit in accordance with the present invention.
Figure 17B:
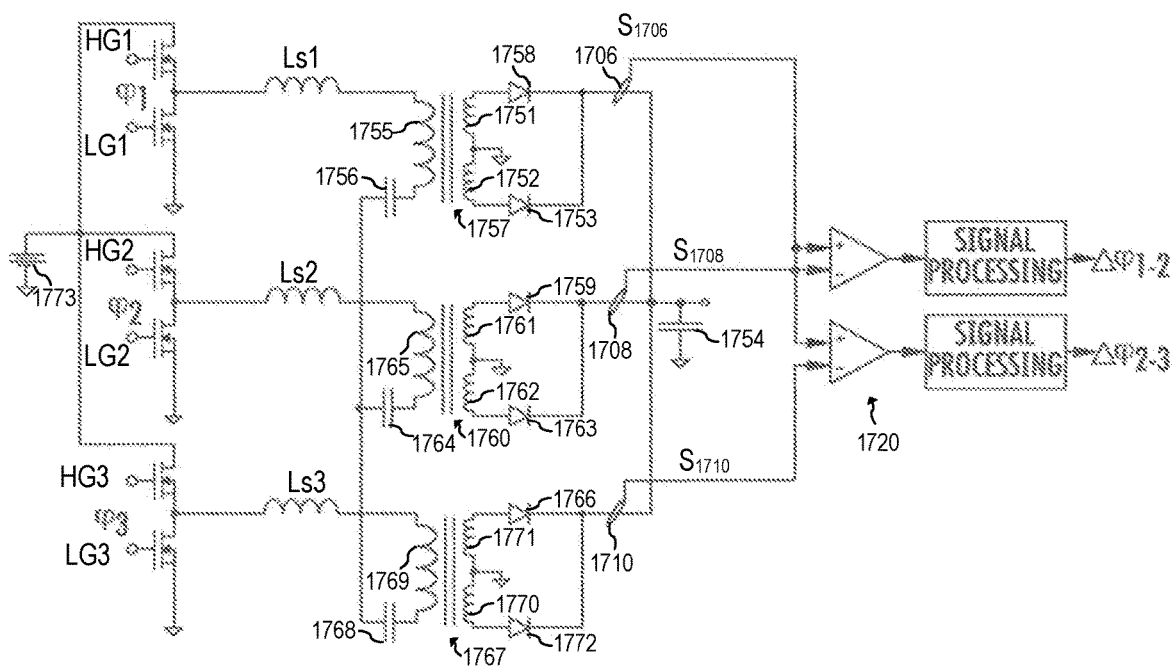
Figure 17C:
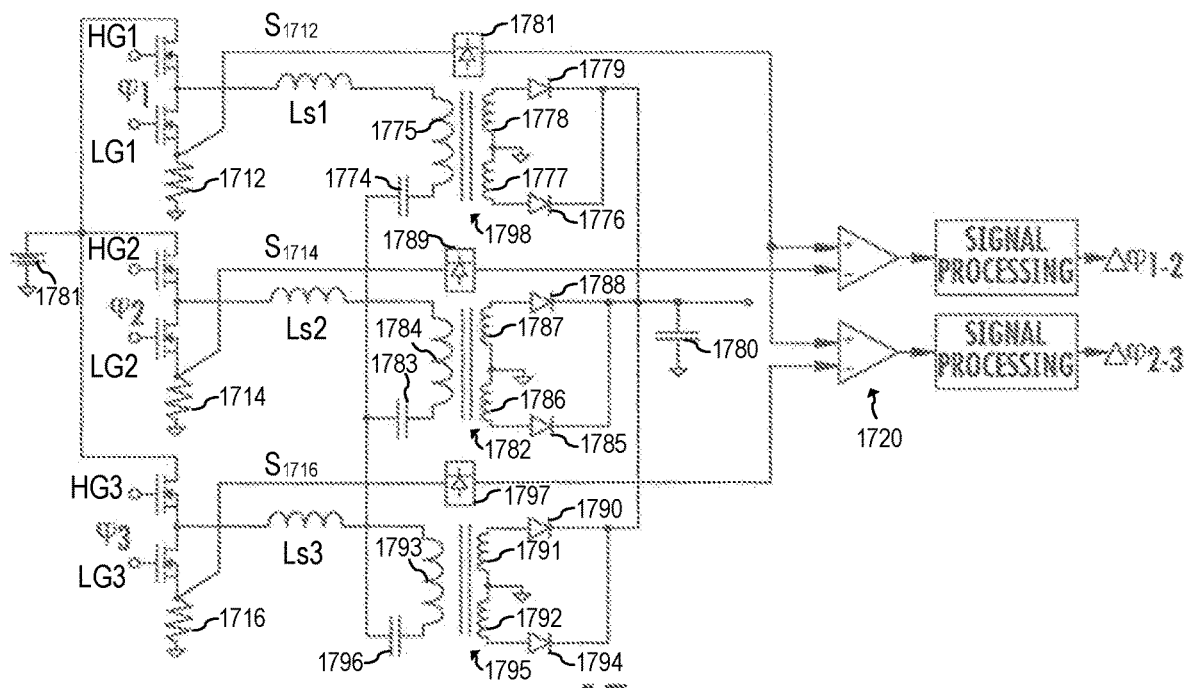

Other exemplary architectures of multiphase resonant converters are illustrated in FIGS. 17a-17c. These converters have sensors (e.g., sensors 1702, 1704, 1706, 1708, 1710, 1712, 1714, 1716) of the current circulating in the primary or secondary windings and configured to generate respective sensing signals (e.g., signals $S_{1702}$, $S_{1704}$, $S_{1706}$, $S_{1708}$, $S_{1710}$, $S_{1712}$, $S_{1714}$, $S_{1716}$) and a comparison circuit (e.g., 1720) that generates phase control signals by comparing the sensing signals among each other. These phase control signals are used for adjusting mutual relative phase among the driving signals of the half-bridges to further balance the functioning conditions of the distinct phase circuits of the converter.

According to an embodiment, the comparison circuit senses the difference between the currents of the phase circuit 1 ($\varphi$1) and of the phase circuit 2 ($\varphi$2), and between the currents of the phase circuit 2 ($\varphi$2) and of the phase circuit 3 ($\varphi$3), generating phase control signals ($\Delta\varphi_{1-2}$, $\Delta\varphi_{2-3}$). Using these phase control signals, mutual relative phases between the driving signal of MOSFErs of phase circuit 2 in respect to that of phase circuit 1 (that, for example, may be considered as a reference), and the relative phases between the driving signals of the MOSFETs of phase circuit 3 in respect to that of phase circuit 2 are adjusted. Table 2 shows exemplary comparison data for evaluating the effect of a correction carried out by the relative phase regulation loop and the consequent reduction of unbalance among the output currents of the distinct phase circuit.

TABLE 2

| Load current | | No relative phase control | With relative phase control |
|---|---|---|---|
| 5A | DC output current of phase circuit 1 | 1.64 A (−1.2%) | 1.64 A (−2.6%) |
| | DC output current of phase circuit 2 | 1.60 A (−10.2%) | 1.73 A (+2.6%) |
| | DC output current of phase circuit 3 | 1.85 A (+11.2%) | 1.67 A (0%) |
| 6A | DC output current of phase circuit 1 | 1.98 A (−1.65%) | 1.94 A (−3.6%) |
| | DC output current of phase circuit 2 | 1.84 A (−8.6%) | 2.08 A (3.1%) |
| | DC output current of phase circuit 3 | 2.23 A (10.4%) | 2.02 A (0.33%) |

The values of parameters of the relative phase regulation loop for correcting the residual unbalance among the phase currents may be even different from the above indicated values. The values of the parameters may be designed according to the characteristics of the application in which the converter is to be used.

Figure 19:
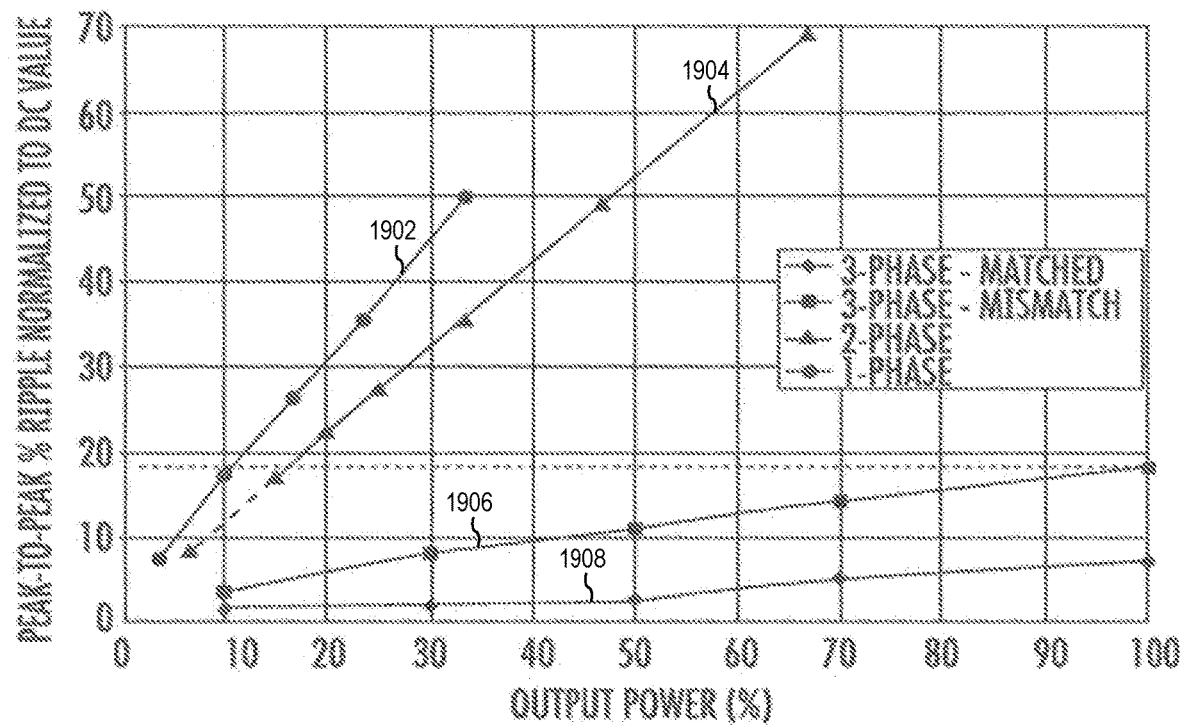
FIG. 19 is a graph of the results of simulations of the amplitude of the peak-to-peak ripple of the output current of the converter with the parameters defined in Table 1 as a function of the number of active phase circuits.

The results of a simulation carried out on one of the converters schematically illustrated in FIGS. 17a-17c with the parameters indicated in Table 1 are graphically illustrated in FIG. 19. To make the output current ripple not exceed the value attained at maximum load when all the three phase circuits are active, the converter may work with only two active phase circuits (e.g., curve 1904) for loads smaller than 15% of the maximum load, and with a single active phase circuit (e.g., curve 1902) for loads smaller than 10% of the maximum load. The optimal compromise between the two will be determined by design considering specifications, characteristics, performance of the converter, and cost restraints.

Figure 20:
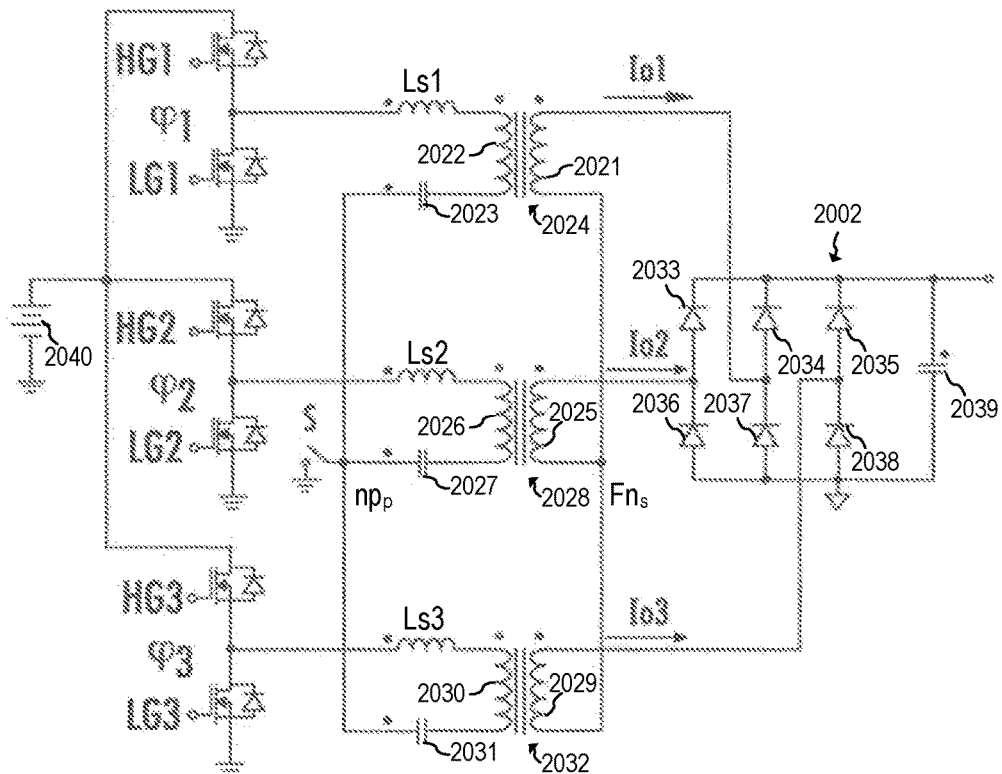
FIG. 20 is a schematic diagram of a second embodiment of a three-phase LLC resonant converter capable of self-balancing the phase currents in accordance with the present invention.

Another example of a three-phase LLC resonant voltage converter having an intrinsic ability of limiting unbalance among phase currents is schematically illustrated in FIG. 20. Even in this case, the three LLC resonant circuits at the primary are connected to the isolated real neutral point $np_p$; the transformers have a single secondary (having half the number of turns of the secondary windings of the transformers used in the architecture of FIG. 9); and the three circuits are coupled to a floating neutral-point Fns of the secondary circuit. The rectifiers 2002 form a three-phase bridge.

Figure 21:
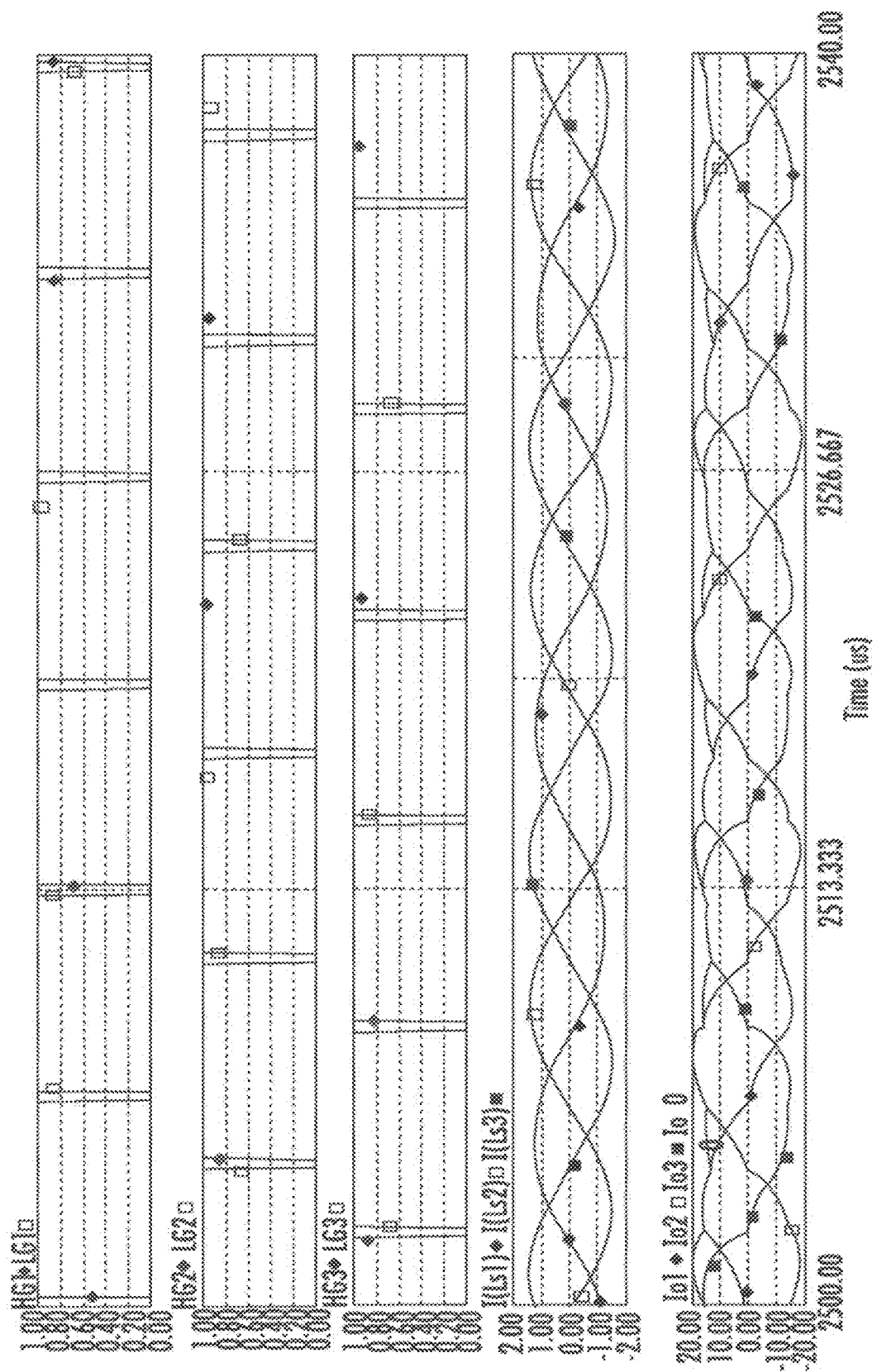
FIG. 21 are time graphs of the driving signals and of the phase currents for the converter of FIG. 20, with an isolated neutral point at the primary and under the same unbalance conditions of the waveforms of FIG. 7.

FIG. 21 graphically shows the waveforms of the driving signals of the half-bridges (also in this case phased apart by 120°) and the waveforms of the primary and secondary currents of the converter of FIG. 20. In this case, the reference capacitors Cr are not identical for all the phase circuits, but the capacitor of the phase circuit 2 is reduced by 10% and the capacitor of the phase circuit 3 is increased by 10%. In these conditions, similar to those used for treating the architecture of the preceding embodiment, the residual unbalance and the peak-to-peak ripple are slightly smaller.

The architecture of the converter of this disclosure simplifies the transformer. It may not be necessary to form two accurately symmetrical secondary windings, as in known converters with split (center-tap) secondary winding. The number of turns is halved, but the rms current that flows therethrough is doubled thus, neglecting high frequency effects, with the same amount of copper used for the windings. Conduction losses remain the same. However, because of the reduced number of turns, the magnitude of high frequency effects is reduced.

Because the neutral point of the secondary circuit is floating, it may be no longer desirable to leave the neutral point of the primary circuit np floating (grounding it as shown in FIG. 20). However, the converter architecture remains effective in reducing unbalance among the phase currents.

Figure 22:
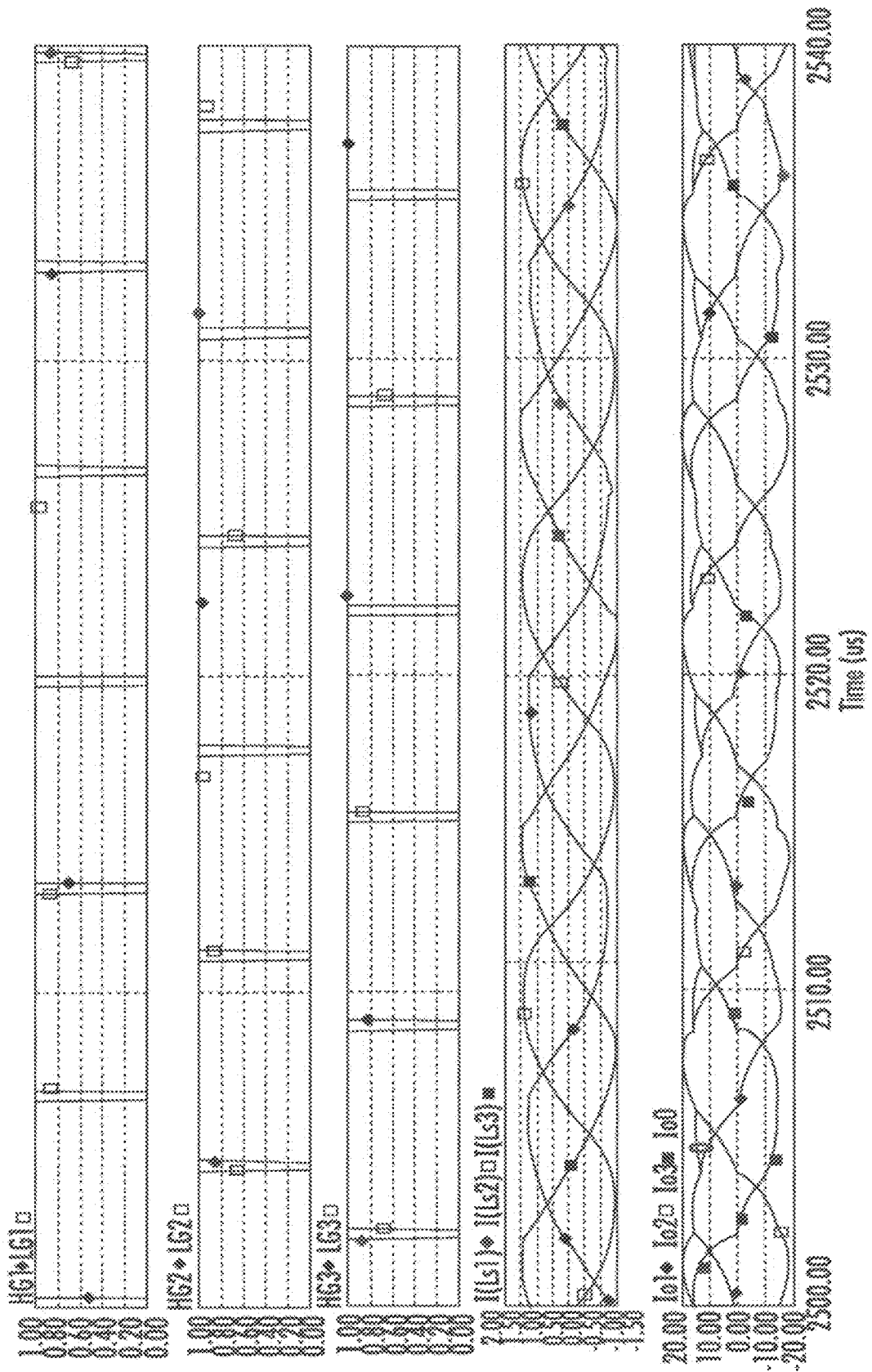
FIG. 22 are time graphs of the driving signal and of the phase currents for the converter of FIG. 20 with a grounded neutral point at the primary and under the same unbalance conditions of FIG. 7.

The results of simulations graphed in FIG. 22 show only marginal differences with respect to those of FIG. 21, with only a slight deformation of primary currents, while the secondary currents remain substantially unchanged, and performance is substantially the same. With this architecture, whether the primary neutral point is floating or not, it may be possible to further reduce the unbalance among the phase currents through a relative phase control loop. This relative phase control may be employed also for the topology of FIG. 9.

Figure 23:
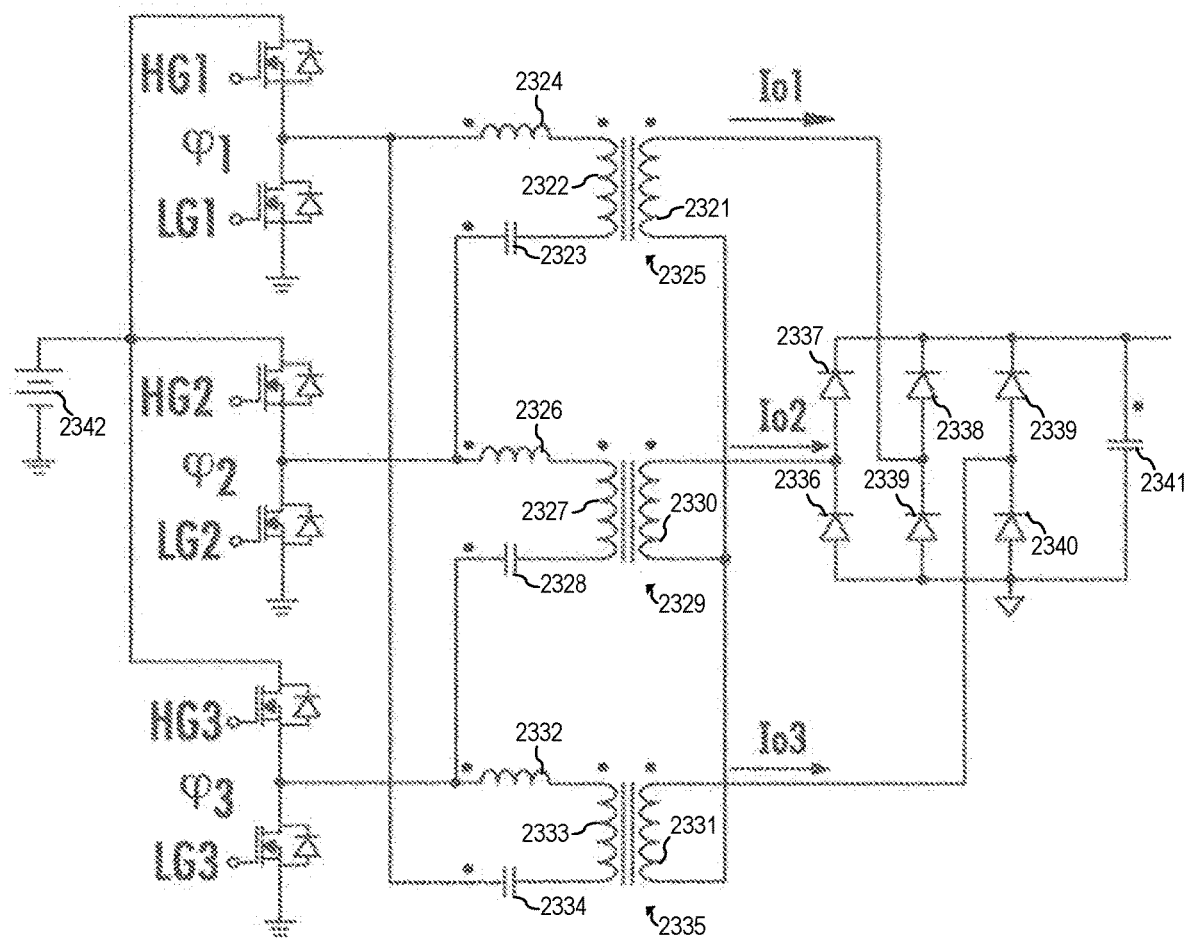
FIG. 23 is a schematic diagram of a third embodiment of a three-phase LLC resonant converter capable of self-balancing the phase currents in accordance with the present invention.

FIG. 23 illustrates a further embodiment of a three-phase LLC resonant circuit intrinsically capable of limiting the unbalance among the phase currents. Compared to the architecture of FIG. 20, the connections of the secondary circuits are the same, and the primary circuits are triangle connected. Even in this case, the neutral point (that in this configuration is virtual and not real) is floating. Given that the primary voltage is larger, the number of turns of the secondary windings is smaller than that of the architecture of FIG. 20.

Figure 24:
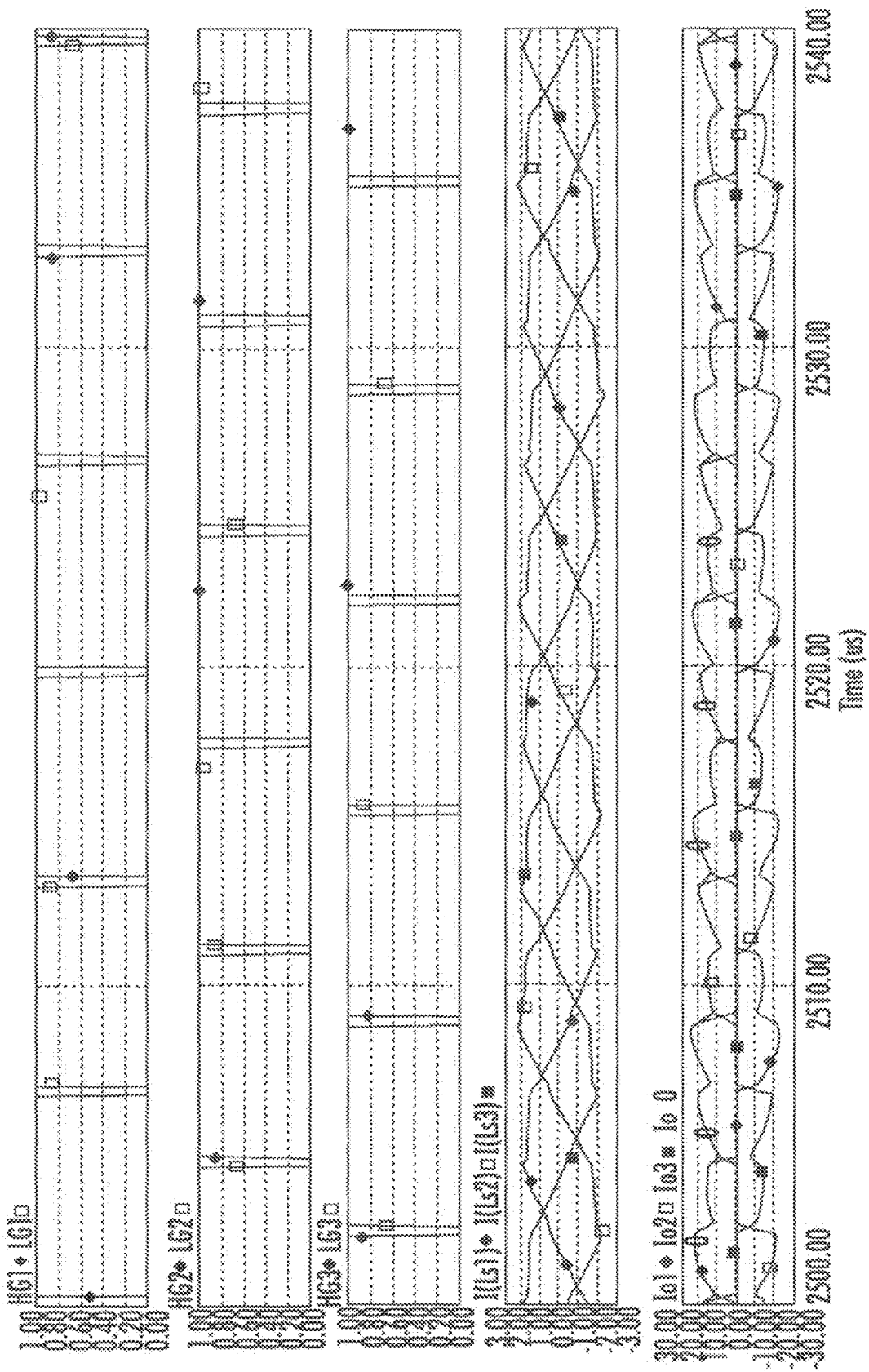
FIG. 24 are time graphs of driving signals and of the phase currents of the converter of FIG. 23 and in the same unbalance conditions of FIG. 7.

The graph of FIG. 24 illustrates the waveforms of the driving signals of the half-bridges (also in this case phased apart by 120°) and the waveforms of the primary and secondary currents when the capacitance of the phase circuit 2 is reduced by 10% and the capacitance of the phase circuit 3 is increased by 10%. Compared to the conditions used for testing the previous architectures, the residual unbalance and the increase of the output current ripple are slightly smaller than the other architectures. Also for this architecture, it may be possible to further reduce the unbalance among the phase currents by employing a relative phase control loop, as compared to the other two previously described architectures.

The invention claimed is:

1. A multi-phase resonant LLC converter comprising:
a plurality of phase circuits;
a plurality of primary windings coupled to the plurality of phase circuits;
a plurality of capacitors electrically coupled to the plurality of primary windings; and
a plurality of secondary windings magnetically coupled to the plurality of primary windings, wherein the multi-phase resonant LLC converter is configured to balance currents flowing through the plurality of primary windings using a floating node, and wherein each of the plurality of primary windings is coupled to the floating node via respective passive components of a plurality of passive components.

2. The multi-phase resonant LLC converter of claim 1, wherein the plurality of passive components is the plurality of capacitors so that each of the plurality of primary windings is coupled to the floating node via a respective capacitor of the plurality of capacitors.

3. The multi-phase resonant LLC converter of claim 1, wherein:
the plurality of phase circuits comprises first, second, and third phase circuits;
the plurality of primary windings comprises first, second, and third primary windings coupled to the first, second, and third phase circuits, respectively;
the plurality of secondary windings comprises first, second, and third secondary windings magnetically coupled to the first, second, and third primary windings, respectively; and
the plurality of capacitors comprises first, second, and third capacitors coupled to the first, second, and third primary windings, respectively.

4. The multi-phase resonant LLC converter of claim 1, wherein each of the plurality of phase circuits comprises a respective half-bridge.

5. The multi-phase resonant LLC converter of claim 4, wherein each half-bridge of the plurality of phase circuits comprises a high-side n-type transistor and a low-side n-type transistor.

6. The multi-phase resonant LLC converter of claim 5, the high-side and low-side n-type transistors of each respective half-bridge is a transistor of the metal-oxide semiconductor field-effect transistor (MOSFET) type.

7. The multi-phase resonant LLC converter of claim 1, further comprising:
an output terminal; and
a plurality of rectifying circuits respectively coupled between each of the plurality of secondary windings and the output terminal.

8. The multi-phase resonant LLC converter of claim 7, further comprising an output capacitor coupled to the output terminal, wherein each of the plurality of rectifying circuits comprises first and second diodes having cathodes coupled to the output capacitor.

9. The multi-phase resonant LLC converter of claim 1, wherein each of the plurality of secondary windings is a center-tap winding.

10. The multi-phase resonant LLC converter of claim 9, wherein each center-tap of the plurality of secondary windings is coupled to a reference node.

11. The multi-phase resonant LLC converter of claim 1, wherein each secondary winding of the plurality of secondary windings is coupled to a second floating node.

12. The multi-phase resonant LLC converter of claim 11, wherein each secondary winding is directly connected to the second floating node.

13. The multi-phase resonant LLC converter of claim 11, further comprising a plurality of current sensors configured to sense winding currents flowing through each of the plurality of primary windings.

14. A multi-phase resonant LLC converter comprising:
a plurality of phase circuits;
a plurality of primary windings coupled to the plurality of phase circuits;
a plurality of capacitors electrically coupled to the plurality of primary windings; and
a plurality of secondary windings magnetically coupled to the plurality of primary windings, wherein the multi-phase resonant LLC converter is configured to balance currents flowing through the plurality of primary windings using a floating node, and wherein each secondary winding of the plurality of secondary windings is coupled to the floating node.

15. The multi-phase resonant LLC converter of claim 14, wherein:
the plurality of phase circuits comprises first, second, and third phase circuits;
the plurality of primary windings comprises first, second, and third primary windings coupled to the first, second, and third phase circuits, respectively;
the plurality of secondary windings comprises first, second, and third secondary windings magnetically coupled to the first, second, and third primary windings, respectively; and
the plurality of capacitors comprises first, second, and third capacitors coupled to the first, second, and third primary windings, respectively.

16. The multi-phase resonant LLC converter of claim 14, wherein each of the plurality of phase circuits comprises a respective half-bridge.

17. The multi-phase resonant LLC converter of claim 16, wherein each half-bridge of the plurality of phase circuits comprises a high-side n-type transistor and a low-side n-type transistor.

18. The multi-phase resonant LLC converter of claim 17, the high-side and low-side n-type transistors of each respective half-bridge is a transistor of the metal-oxide semiconductor field-effect transistor (MOSFET) type.

19. The multi-phase resonant LLC converter of claim 14, further comprising a first diode having an anode coupled to a first secondary winding of the plurality of secondary windings.

20. The multi-phase resonant LLC converter of claim 14, wherein each secondary winding of the plurality of secondary windings is directly connected to the floating node.

21. The multi-phase resonant LLC converter of claim 14, further comprising a plurality of rectification circuits coupled to the plurality of secondary windings, each rectification circuit of the plurality of rectification circuits coupled to a respective first terminal of respective secondary windings of the plurality of secondary windings, wherein a second terminal of each secondary winding of the plurality of secondary windings is coupled to the floating node.

22. A three-phase resonant LLC converter comprising:
first, second, and third phase circuits;
first, second, and third primary windings coupled to the first, second, and third phase circuits, respectively;
first, second, and third secondary windings magnetically coupled to the first, second, and third primary windings, respectively; and
first, second, and third capacitors coupled to the first, second, and third primary windings, respectively, wherein the first, second, and third secondary windings are directly connected to a neutral point that is electrically floating.

23. The three-phase resonant LLC converter of claim 22, further comprising a first diode having an anode directly connected to the first secondary winding.

* * * * *